(12) United States Patent
Filatov

(10) Patent No.: US 10,508,932 B2
(45) Date of Patent: Dec. 17, 2019

(54) MEASURING THE POSITION OF AN OBJECT USING EDDY-CURRENTS

(71) Applicant: Calnetix Technologies, LLC, Cerritos, CA (US)

(72) Inventor: Alexei Filatov, Irvine, CA (US)

(73) Assignee: Calnetix Technologies, LLC, Cerritos, CA (US)

( * ) Notice: Subject to any disclaimer, the term of this patent is extended or adjusted under 35 U.S.C. 154(b) by 284 days.

(21) Appl. No.: 15/483,688

(22) Filed: Apr. 10, 2017

(65) Prior Publication Data
US 2018/0292235 A1    Oct. 11, 2018

(51) Int. Cl.
*G01D 5/20*    (2006.01)
*G01D 5/22*    (2006.01)

(52) U.S. Cl.
CPC ......... *G01D 5/2275* (2013.01); *G01D 5/2053* (2013.01)

(58) Field of Classification Search
CPC ............................. G01D 5/2006; G01D 5/202
USPC ........................................ 324/207.17, 207.15
See application file for complete search history.

(56) References Cited

U.S. PATENT DOCUMENTS

| | | | | |
|---|---|---|---|---|
| 6,838,873 B2 * | 1/2005 | James | .................. | D06F 39/003 324/207.16 |
| 8,258,777 B2 * | 9/2012 | Chen | ..................... | G01B 7/023 324/207.15 |
| 8,653,810 B2 * | 2/2014 | Cobb | ..................... | G01R 33/18 324/209 |
| 9,304,225 B2 * | 4/2016 | Reime | ..................... | G01V 3/10 |
| 9,752,899 B2 * | 9/2017 | Goto | ..................... | G01D 5/2258 |
| 2007/0257667 A1 * | 11/2007 | Schroeder | ............ | G01D 5/2073 324/207.17 |
| 2015/0153742 A1 * | 6/2015 | Ko | ..................... | G05D 3/12 700/213 |

(Continued)

FOREIGN PATENT DOCUMENTS

DE    102012015200 A1 †  2/2014

OTHER PUBLICATIONS

Wikipedia, "LC Circuit," Nov. 17, 2016, captured Nov. 25, 2016, https://web.archive.org/web/20161125232236/http://en.wikipedia.org/wiki/LC_circuit.†

*Primary Examiner* — Patrick Assouad
*Assistant Examiner* — Robert P Alejnikov, Jr.
(74) *Attorney, Agent, or Firm* — Fish & Richardson P.C.

(57) ABSTRACT

Noncontact measurements of positions of electrically-conductive objects is achieved by placing two conductive coils formed by traces on printed circuit boards (PCBs) in the proximity of the object surface, energizing one of the coils (excitation coil) with alternating electrical current and measuring the amplitude of the voltage induced on the terminals of the second coil (sensing coil). The alternating magnetic field generated by the current in the excitation coil induces eddy currents in the object, which affect the amplitude of the voltage induced on the terminals of the sensing coil. The sensing coil voltage depends on the mutual position between the object and the sensing coil, allowing the object position measurement. The excitation coil is integrated into a series LCR circuit driven by an output of an adjustable gain amplifier at the resonance frequency. The adjustable amplifier gain is constantly adjusted to maintain the sensor sensitivity constant.

14 Claims, 22 Drawing Sheets

(56) References Cited

U.S. PATENT DOCUMENTS

2015/0362340 A1\* 12/2015 Montagne .............. G01D 5/225
324/207.17

\* cited by examiner
† cited by third party

MEASURING THE POSITION OF AN OBJECT USING EDDY-CURRENTS

TECHNICAL FIELD

This disclosure relates to non-contact measurements of positions of objects.

BACKGROUND

A typical eddy-current sensor used to measure a position of an electrically-conductive object includes a cylindrical coil wound with a very fine magnet wire and energized with a high frequency alternating current. When a conductive object is placed in the proximity of such a coil, the alternating magnetic field produced by the current in the coil, induces eddy currents in the object, which change the impedance of the coil. This change in impedance depends on the distance between the object and the coil, and, therefore, can be used as a raw measure of the object position.

One of the applications of the position sensors is in Active Magnetic Bearing (AMB) Systems where they may be used to support rotors of rotating machines without mechanical contact in conjunctions with electromagnetic actuators and control systems. Position sensors in an AMB may constantly monitor the position of the rotor with respect to a stator and send information about the rotor position to a control system. Based on this information, the control system may apply electrical control currents to electromagnetic actuators, which may generate forces necessary to keep the rotor in the desired position without mechanical contact.

SUMMARY

Certain aspects of the subject matter described here can be implemented as an apparatus for a non-contact measurement of the position of a sensor target relative to a sensor head along a measurement axis. The sensor head includes excitation and sensing Printed Circuit Board (PCB) coils. The electrically conductive sensor target is located in a close proximity to both excitation and sensing PCB coils without coming to a mechanical contact with any of them. The excitation coil is energized with an alternating current generating excitation alternating magnetic field which induces electrical eddy-currents in the electrically conductive sensor target. These eddy currents in the sensor target in turn induce their own alternating magnetic fields which couple to the sensing PCB coil and induce voltage across its terminals in accordance with the Faraday's law in addition to the voltage which may also be induced by the excitation magnetic field in a similar way. Since the voltage induced by the magnetic fields generated by the eddy currents in the sensor target across the terminals of the sensing PCB coil depend on the sensor target position with respect to the sensing PCB coil, this voltage can be used as a measure of the sensor target displacement.

In some implementations, the voltage induced on the terminals of the sensing PCB coil by the magnetic field generated by the eddy currents in the sensor target changes because the normal distance between the sensing PCB coil and the sensor target changes. In this case the position sensor measures the target displacements in the direction that changes the normal distance between the sensing PCB coil and the sensor target.

In other implementations, the voltage induced on the terminals of the sensing PCB coil by the magnetic field generated by the eddy currents in the sensor target changes because the overlap between the sensing PCB coil and the surface of the sensor target changes. In this case the position sensor measures the target displacements in the direction that changes the overlap between the sensing PCB coil and the surface of the sensor target.

The apparatus further includes sensor drive electronics which generates alternating electrical current in the excitation PCB coil and the sensor signal processing electronics which produces an output signal (e.g. voltage or current), representing the sensor target position, based on the voltage across the terminals of the sensing PCB coil. The sensor drive electronics includes a capacitor connected in series with the excitation PCB coil forming a series resonance LCR circuit, where L and R are, at the minimum, the inductance and the capacitance of the excitation PCB coil, respectively, and C is the capacitance of the capacitor. Additional inductances and resistances can be added in series to this LCR circuit if necessary. The sensor drive electronics further includes a current measurement device, which measures the current in the LCR circuit, an adjustable gain amplifier, which applies a drive voltage to the terminals of the LCR circuit proportional to the current in the LCR circuit, forming a self-exciting positive feedback loop, a current-limiting negative feedback circuit, which reduces the amplifier gain when the absolute value of the current amplitude increases and a current-amplitude feedback control, which adjust the amplifier gain to keep constant the amplitude of the current in the LCR circuit. Alternatively, the sensor drive may include a current-time-derivative-amplitude feedback control instead of the current-amplitude feedback control to keep constant the amplitude of the time derivative of the current in the LCR circuit rather than the amplitude of the current itself.

Contrary to commercially available eddy-current probes, using coils wound with relatively thick magnet wires, the disclosed position sensor uses coils made as PCB traces with very small thicknesses, and, consequently, having much higher portions of the resistive components in the overall impedances compared to the traditional eddy-current probes, where the inductive impedance components completely dominate the resistive ones. The main complication with using PCB coils is that their resistive components of the impedances change with temperature, which would cause thermal drifts of the sensor outputs in conventional eddy-current probes where changes of the overall coil impedances are normally used as measures of the sensor target displacements. To overcome this problem, the following is done in the disclosed sensor:

1. Voltage induced on the terminals of a separate sensing coil is used as a measure of the sensor target displacement rather than the impedance of the excitation coil. If this voltage is measured with a high-impedance circuit, the reading will not be affected by the resistance of the sensing coil.
2. A feedback control in the sensor drive circuit maintains a constant amplitude of either the excitation current or the time derivative of the excitation current in the excitation PCB coil regardless of the coil impedance. Therefore, the amplitude of either the magnetic field inducing eddy-currents in the sensor target or its time derivative is also maintained constant.

Using LCR resonance circuit instead of directly driving the excitation PCB coil with the amplifier minimizes drive voltage levels and power dissipation in the amplifier because the LCR circuit is always excited at its resonance frequency, in which case the voltage drops on the inductance L and the capacitance C cancel each other and the voltage drop across the terminals of the LCR circuit is equal to the voltage drop on the resistive component of the impedance R only.

Because the disclosed position sensor does not require the inductive components of the PCB coil impedances (which are proportional to the excitation frequency) to be much larger than the resistive components (nearly independent of the excitation frequency), it can be used with smaller excitation frequencies. This makes the drive and signal processing electronics simpler and cheaper and also minimizes effects of the impedances of the cables connecting the PCB coils to the electronics on the sensor performance.

In some implementations, the negative feedback control is configured to maintain constant amplitude of the time derivative of the current I in the excitation LCR circuit, not the amplitude of the current I itself. This method is more accurate than maintaining the current amplitude because the voltage induced in the sensing coil is more directly related to the time derivative of the excitation current than the current itself in accordance with Faraday's law. If the excitation current I is sinusoidal, the amplitude of its time derivative is equal to $\omega I_0$, where $\omega$ is the circular frequency of the excitation current I, equal in this design to the resonance frequency of the LCR circuit, and $I_0$ is the amplitude of the excitation current I. The product $\omega I_0$ can be monitored as a voltage drop $U_{mon}$ across an additional monitoring inductance $L_{mon}$ wired in series with the excitation LCR circuit: $U_{mon}=L_{mon}\omega I_0$. Alternatively this product can be monitored as a voltage across the secondary winding of a monitoring transformer, which primary winding is connected on series with the excitation LCR circuit: $U_{mon}=M_{mon}\omega I_0$, where $M_{mon}$ is the mutual inductance between the primary and secondary windings of the monitoring transformer.

In some implementations, the excitation PCB coil and the sensing PCB coil are made at different layers of a single multi-layered PCB.

In some implementations, the space behind the excitation PCB coil is filled with magnetically permeable but electrically non-conductive or weakly conductive media to enhance the excitation magnetic field generated by the excitation current in the excitation PCB coil.

In some implementations, the excitation PCB coil is composed of two excitation PCB coil portions located side-by-side along the direction perpendicular to the measurement direction and oriented so that the magnetic fields produced by the coil portions both have substantial components orthogonal to the lateral surface of the sensor target, the excitation PCB coil portions are connected in series so that the magnetic fields components orthogonal to the lateral surface of the sensor target they produce have opposite directions.

In some implementations, PCBs containing excitation PCB coils and sensing PCB coils are made flexible and shaped to follow the profile of the sensor target so that the excitation PCB coils and the sensing PCB coils are located close to the surface of the sensor target at every point of the overlapping area between the coils and the sensor target surface and separated by a uniform distance.

In some implementations, the sensor target has a cylindrical shape with a rotational axis, both excitation PCB coils and sensing PCB coils are located close to a cylindrical surface of the sensor target and are fully overlapped by the surface at all axial positions of the sensor target. The voltage across the terminals of the sensing coil in this configuration depends on the radial displacements of the sensor target along the radii passing through the sensing PCB coil and is nearly independent of the axial displacements of the sensor target.

In some implementations, the sensor target has a cylindrical shape with a rotational axis, the excitations PCB coil is the first excitation PCB coil, the sensing PCB coil is the first sensing PCB coil, the first excitation PCB coils and the first sensing PCB coils are located close to a cylindrical surface of the sensor target and are at least partially overlapped by the cylindrical surface of the sensor target. In addition, there are second excitation PCB coil and the second sensing PCB coil located in a symmetrical manner diametrically opposite from the first excitation PCB coil and the first sensing PCB coil respectively. The first excitation PCB coil and the second excitation PCB coil are connected in series and are parts of a single LCR resonance circuit. The first sensing PCB coil and the second sensing PCB coil are connected in series so that the voltages across the output terminals of these two coils subtract and the resulting sensor output voltage can be used to measure the radial sensor target displacement along the diagonal passing through the two PCB coil sets. The sensor output voltage in this configuration depends on the radial displacements of the sensor target along the radii passing through the sensing PCB coil in a nearly linear manner and is nearly independent of the axial displacements of the sensor target.

In some implementations, the sensor target has a cylindrical shape with a rotational axis, the excitations PCB coil is the first excitation PCB coil, the sensing PCB coil is the first sensing PCB coil, the first excitation PCB coils and the first sensing PCB coils are located close to a cylindrical surface of the sensor target and are partially overlapped by the cylindrical surface of the sensor target. In addition, there are second excitation PCB coil and the second sensing PCB coil located in a symmetrical manner diametrically opposite from the first excitation PCB coil and the first sensing PCB coil respectively. The first excitation PCB coil and the second excitation PCB coil are connected in series and are parts of a single LCR resonance circuit. The first sensing PCB coil and the second sensing PCB coil are connected in series so that the voltages across the output terminals of these two coils add up and the resulting voltage can be used to measure the axial sensor target displacement. The sensor output voltage in this configuration depends on the axial displacement of the sensor target in a nearly linear manner and is nearly independent of the radial displacements of the sensor target.

In some implementations, the sensor target has a cylindrical shape with a rotational axis, the excitations PCB coil is the first excitation PCB coil, the sensing PCB coil is the first sensing PCB coil, the first excitation PCB coils and the first sensing PCB coils are located close to a cylindrical surface of the sensor target and are partially overlapped by the cylindrical surface of the sensor target. In addition, there are second, third and fourth excitation PCB coil and a second, third and fourth sensing PCB coils. The second excitation PCB coil and the second sensing PCB coil are located in a symmetrical manner diametrically opposite from the first excitation PCB coil and the first sensing PCB coil respectively. The third and the fourth excitation PCB coils are located symmetrically to the first and the second excitation PCB coils with respect to the sensor target axial middle plane. Similarly, the third and the fourth sensing PCB coils are located symmetrically to the first and the second sensing PCB coils with respect to the sensor target axial middle plane. The first, the second, the third and the fourth excitation PCB coils are connected in series and are parts of a single LCR resonance circuit. The first sensing PCB coil and the third sensing PCB coil are connected in series so that the voltages across the output terminals of these two coils subtract and the resulting voltage is called a symmetric sensor voltage. The second sensing PCB coil and the fourth sensing PCB coil are connected in series so that the voltages across the output terminals of these two coils subtract and the resulting voltage is called a skewed sensor voltage. The sum of the symmetric and skewed sensor voltages produce sensor radial output voltage, which depends on the radial displacement of the sensor target in a nearly linear manner and is nearly independent of the axial displacements of the sensor target. The difference between the symmetric and skewed sensor voltages produce sensor axial output voltage, which depends on the axial displacement of the sensor target in a nearly linear manner and is nearly independent of the radial displacements of the sensor target.

DETAILED DESCRIPTION

Figure 1A:
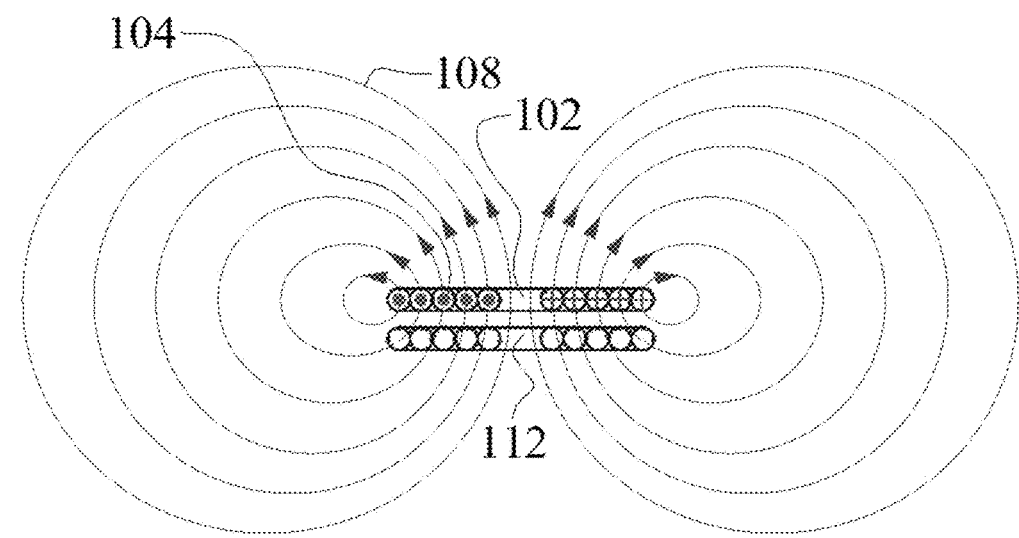
FIGS. 1A and 1B are schematic illustrations of the operational principle of the position sensor per present disclosure configured to measure sensor target displacements which change the normal distance between the sensor target and the sensor.

This disclosure relates to measuring positions of objects, and more particularly, noncontact measuring positions of objects through measurements of electrical voltages induced in sensing Printed Circuit Board (PCB) coils by time-varying magnetic fields produced by eddy-currents generated in electrically conductive sensor targets located proximate to the sensing PCB coils by time-varying magnetic fields produced by electrical alternating currents flowing in excitation PCB coils, also located proximate to the sensor targets.

Using PCB coils instead of conventional coils wound with magnet wire brings several important advantages:
1. PCB coils are inexpensive and well suited for mass production.
2. Very high turn density in the PCB coils allows placing enough turns very close to the sensor target surface to obtain needed sensitivity.

3. PCBs can be made flexible, which allows shaping them to follow the profile of the sensor target surface, maximizing sensitivity.

A complication with using PCB coils us that, contrary to the coils wound of magnet wire, they have a large percentage of the resistive component in the overall coil impedance, which changes with temperature creating a risk of a thermal drift of the sensor readings. Using two PCB coils (excitation and sensing) along with other measures described below solves this problem.

Firstly, the disclosed sensor drive electronics is configured to maintain either constant amplitude of the sinusoidal electrical current in the excitation PCB coil, or, in even more accurate embodiments, a constant amplitude of the current time derivative. This eliminates the effects of the excitation PCB coil resistance on the sensor output.

Secondly, with a high-impedance device used to measure the voltage induced in the sensing PCB coil, there is effectively no current in the sensing coil, and, therefore, no resistive voltage drop. This eliminates the effects of the sensing PCB coil resistance on the sensor output.

FIGS. 1A and 1B through FIGS. 4A and 4B illustrate the basic operational principle of the disclosed subject matter. The excitation PCB coil 102 in FIGS. 1A and 1B through FIGS. 4A and 4B is energized with a sinusoidal alternating current 104 by applying a sinusoidal alternating excitation voltage 106 (see FIG. 2). The sinusoidal alternating excitation current 104 generates excitation alternating magnetic field 108 shown in FIGS. 1A and 3A, which induces electrical eddy-currents (not shown) in the electrically conductive sensor target 110 (see FIGS. 1B and 3B). These eddy currents, in turn, induce their own alternating magnetic fields (not shown) which couple to the sensing PCB coil 112 and induce voltage across its terminals in accordance with the Faraday's law in addition to the voltage which may have already been induced by the excitation magnetic field 108 in a similar way. The net electrical voltage 114 (see FIG. 2) across the terminals of the sensing PCB coil 112 is the voltage induced by the net magnetic field 116, shown in FIGS. 1B and 3B, which is the sum of the excitation magnetic field 108 and the magnetic field induced by the eddy currents in the sensor target 110. Since the voltage induced by the magnetic fields generated by the eddy currents in the sensor target 110 across the terminals of the sensing PCB coil 112 depends on the sensor target 110 position with respect to the sensing PCB coil 112, this voltage can be used as a measure of the sensor target displacement.

In more details, FIG. 1A shows the excitation PCB coil 102, energized with sinusoidal alternating excitation electrical current 104, which generates alternating excitation magnetic field 108. The directions of the excitation electrical current 104 are indicated by dots when the current goes out of the page and by crosses when the current goes into the page.

Figure 2:
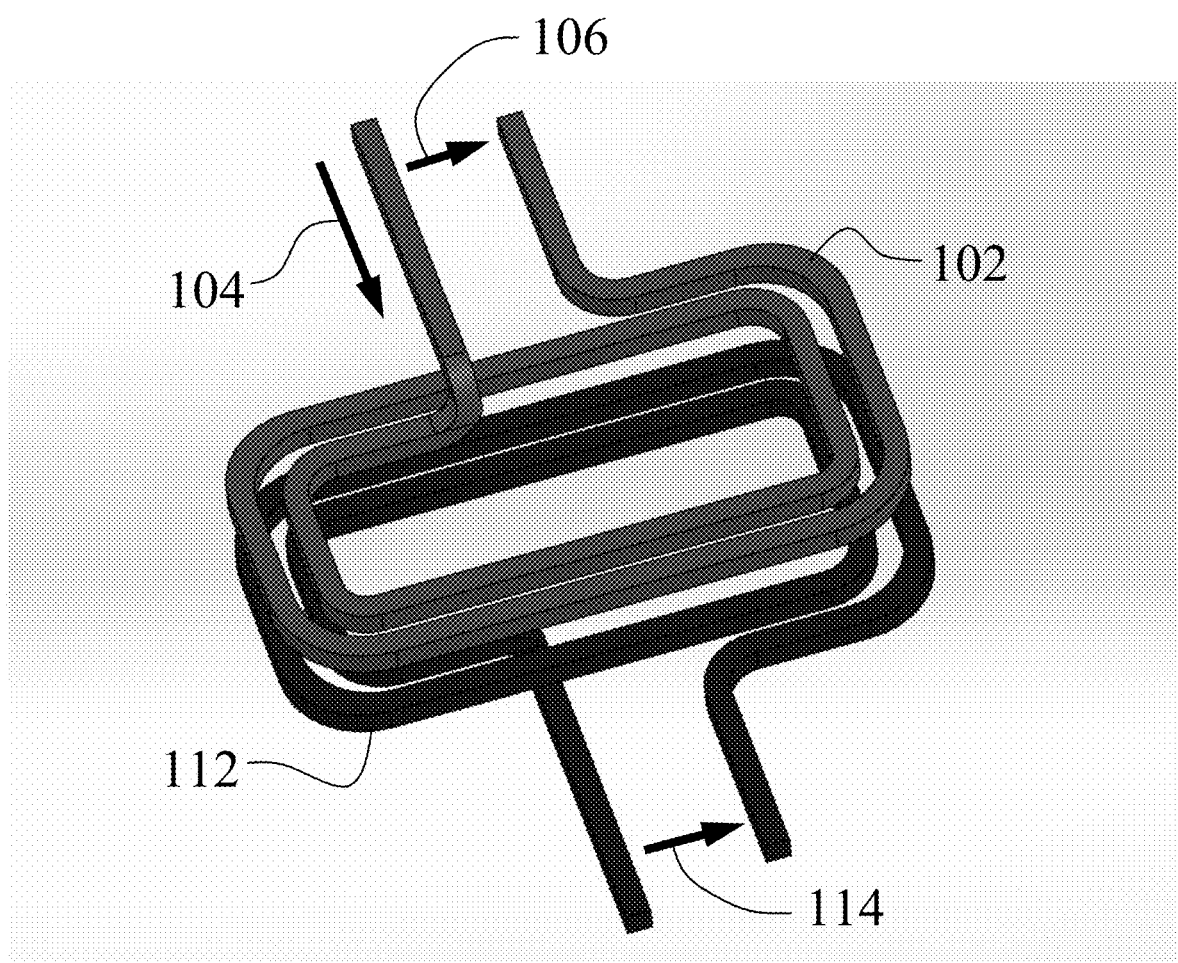
FIG. 2 is a schematic 3D illustration of the excitation and sensing coil arrangement used in the disclosed sensor.

FIG. 2 provides a schematic 3D illustration of the sensor arrangement including the excitation PCB coil 102 and the sensing PCB coil 112 placed on top of each other. The space between the coils is exaggerated and only two turns are shown for clarity purposes. The coil profile is shown as rectangular in FIG. 2, but it can be any, such as round, oval, etc. FIG. 2 also shows the sinusoidal excitation voltage 106 applied across the terminal of the excitation PCB coil 102 in order to induce the excitation current 104.

FIG. 1A further shows the distribution of the excitation magnetic field 108 generated in the absence of the electrically-conductive sensor target 110. A portion of the magnetic field 108 in FIG. 1A couples to the sensing PCB coil 112, and, in accordance with the Faraday's law, induces some alternating voltage 114 (see FIG. 2) across its terminals.

Figure 1B:
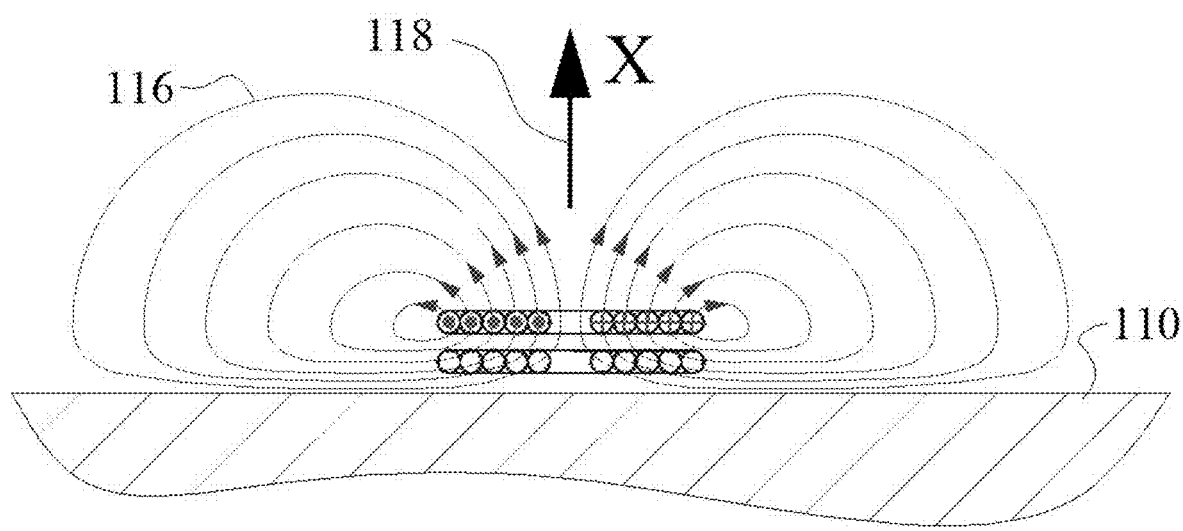

When an electrically conductive sensor target 110 is placed in the proximity of the excitation PCB coil 102 (see FIG. 1B) so that it becomes exposed to the excitation magnetic field 108, the magnetic field 108 induces eddy currents in the sensor target 110, which generate their own magnetic field. The net magnetic field 116 shown in FIG. 1B would be a superposition of the excitation magnetic field 108 shown in FIG. 1A and the magnetic field generated by the eddy currents in the sensor target 110 (not shown). At sufficiently high frequencies, the net magnetic field 116 is effectively expelled from the volume of the sensor target 110 as illustrated in FIG. 1B—a phenomenon known as the "skin effect".

Similarly to the magnetic fields, the voltage 114 induced across the terminals of the sensing PCB 112 is a superposition of the voltage produced by the excitation magnetic field 108 and the magnetic field generated by the eddy currents. If the sinusoidal excitation magnetic field 108 is maintained constant in amplitude, the amplitude of the voltage across the terminals of the sensing PCB coil 108 may only change because of the contribution from the eddy-current induced magnetic field, which may change with the position of the sensor target 110.

An alternative way to look at the problem is to note that the alternating voltage across the terminals of the sensing PCB coil 112 $U_{sens}$ (114) is proportional in amplitude to the portion of the total magnetic flux 116 coupled to the sensing PCB coil 112. The distribution of the total magnetic field 116 changes from being the same as the distribution of the excitation magnetic field 108 shown in FIG. 1A in the absence of the sensor target 110, to the distribution illustrated in FIG. 1B when the sensor target 110 is introduced. At sufficiently high frequencies, the net magnetic field 116 will be effectively expelled from the sensor target 110 due to the skin effect, as illustrated in FIG. 1B.

Since the distribution of the net magnetic field 116 depends on the position of the sensor target 110, the portion of the net magnetic field 116 linked to the sensing PCB coil 112, and, consequently, the voltage $U_{sens}$ (114) induced across the terminals of the sensing PCB coil 112 may depend on the position of the sensor target 110. This is illustrated in FIGS. 3A and 3B using the most inner turn of the sensing PCB coil shown in FIGS. 1A and 1B.

Figure 3A:
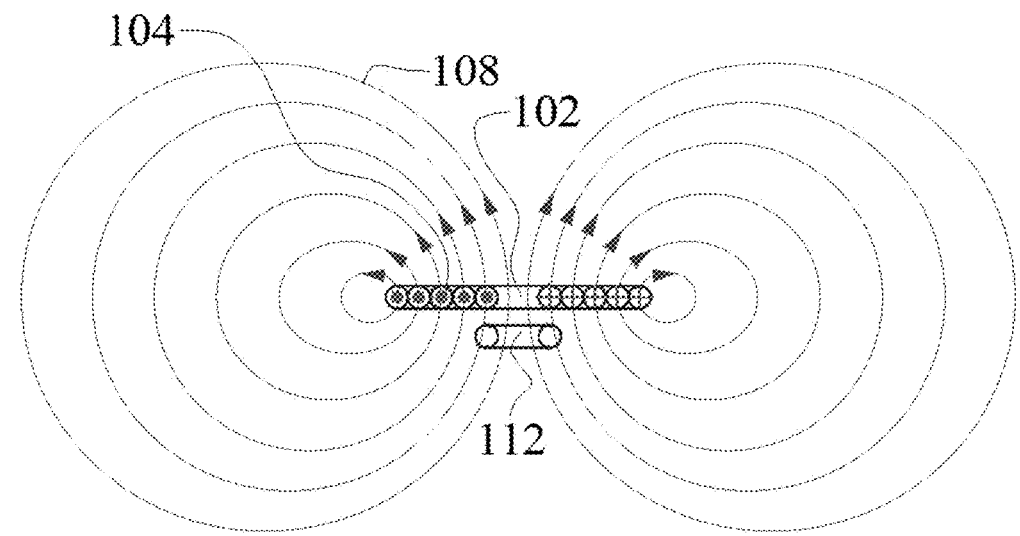
FIGS. 3A and 3B are schematic illustrations of how the magnetic flux coupled to one of the turns of the sensing PCB coil in FIG. 1 changes with the distance between the sensing PCB coil and the sensor target.

FIG. 3A shows the distribution of the net magnetic field in the absence of the sensor target 110, which is equal to the excitation magnetic field 108. In this case two flux lines cross the cross-section of the first turn of the sensing PCB coil 112.

Figure 3B:
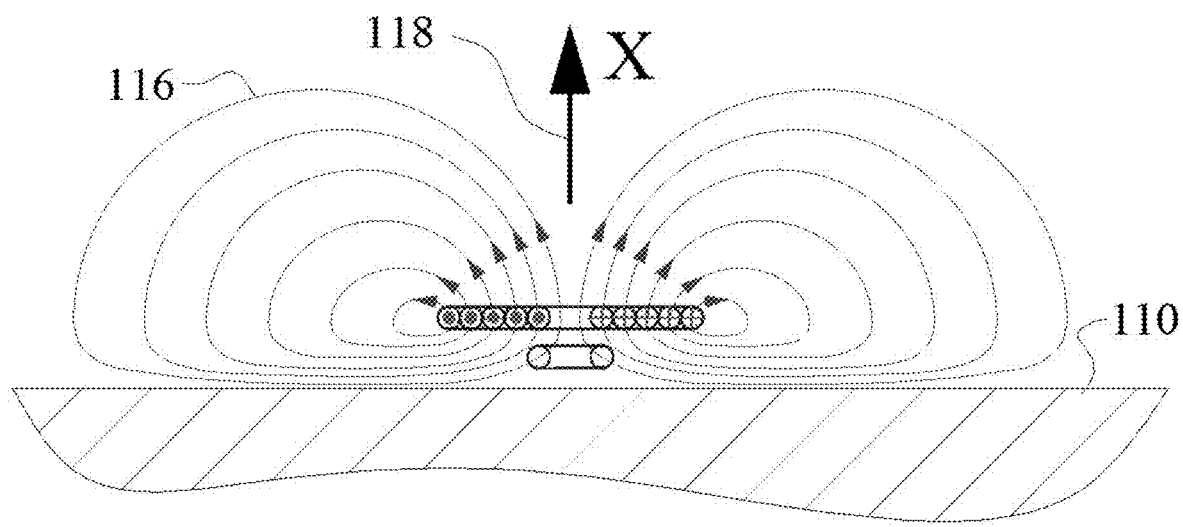

FIG. 3B shows the distribution of the net magnetic field 116 in the presence of the sensor target 110. The net magnetic field 116 is expelled from the volume of the electrically-conductive sensor target 110 due to the skin effect and only one flux line crosses the cross-section of the first turn of the sensing PCB coil 112. Since the voltage 114 induced across the terminals of the sensing PCB coil 112 in accordance with the Faraday's law is proportional in amplitude to the magnetic flux linked to the coil, this voltage will be smaller in the case shown in FIG. 3B than in FIG. 3A.

FIGS. 1A and 1B and FIGS. 3A and 3B show the sensor target 110 extending far beyond the footprints of the excitation PCB coil 102 and the sensing PCB coil 112. In this case, the sensor outputs are unaffected by the sensor target movements parallel to the coil planes—the sensor only senses the target movements in one direction—along the axis X (118) normal to the sensing coil plane.

Figure 4A:
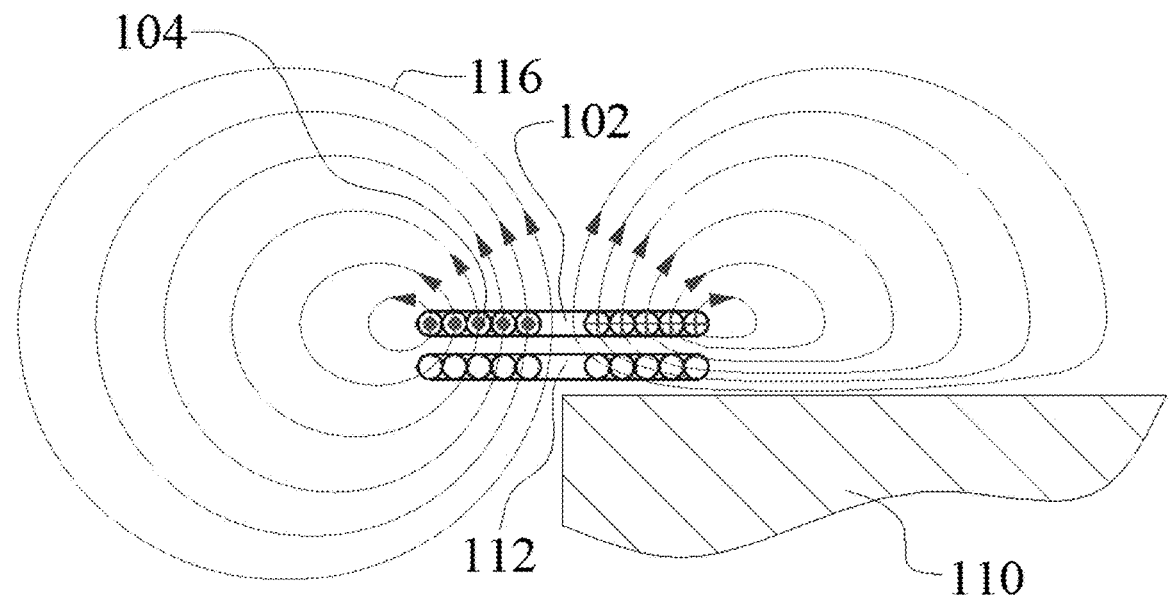
FIGS. 4A and 4B are schematic illustrations of the operational principle of the position sensor per present disclosure configured to measure sensor target displacements which change the amount of overlap between the sensor target and the sensing PCB coil assuming that the normal distance between the sensor and the target is maintained constant.
Figure 4B:
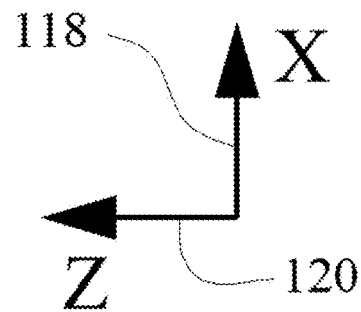
Figure 4B:
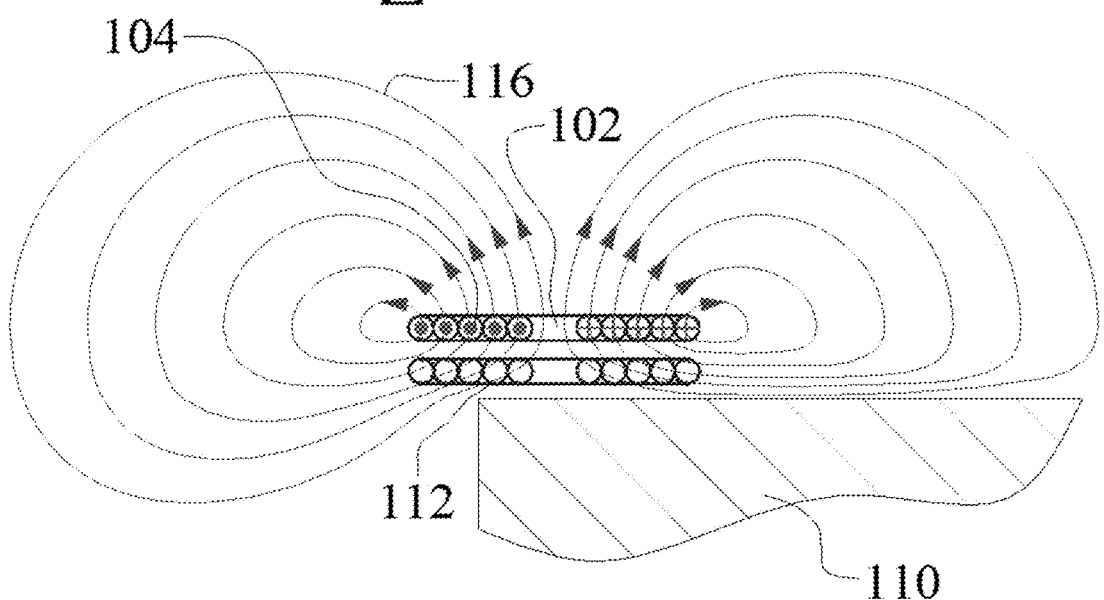

FIGS. 4A and 4B show arrangements when the sensor target 110 does not cover the entire footprints of the excitation PCB coil 102 and the sensing PCB coil 112. In this case sensor target movements parallel to the sensing PCB coil plane along the axis Z (120), as well as the movements along the axis X (114) normal to the plane, will cause changes of the magnetic flux 116 linked to the sensing PCB coil 112, and consequently changes of the voltage 114 induced across the coil terminals. If the normal distance between the sensor target 110 and the sensing PCB coil 112 is maintained constant, the sensor can be used to measure the sensor target displacements along the Z axis (120) parallel to the sensing PCB coil plane.

Figure 5:
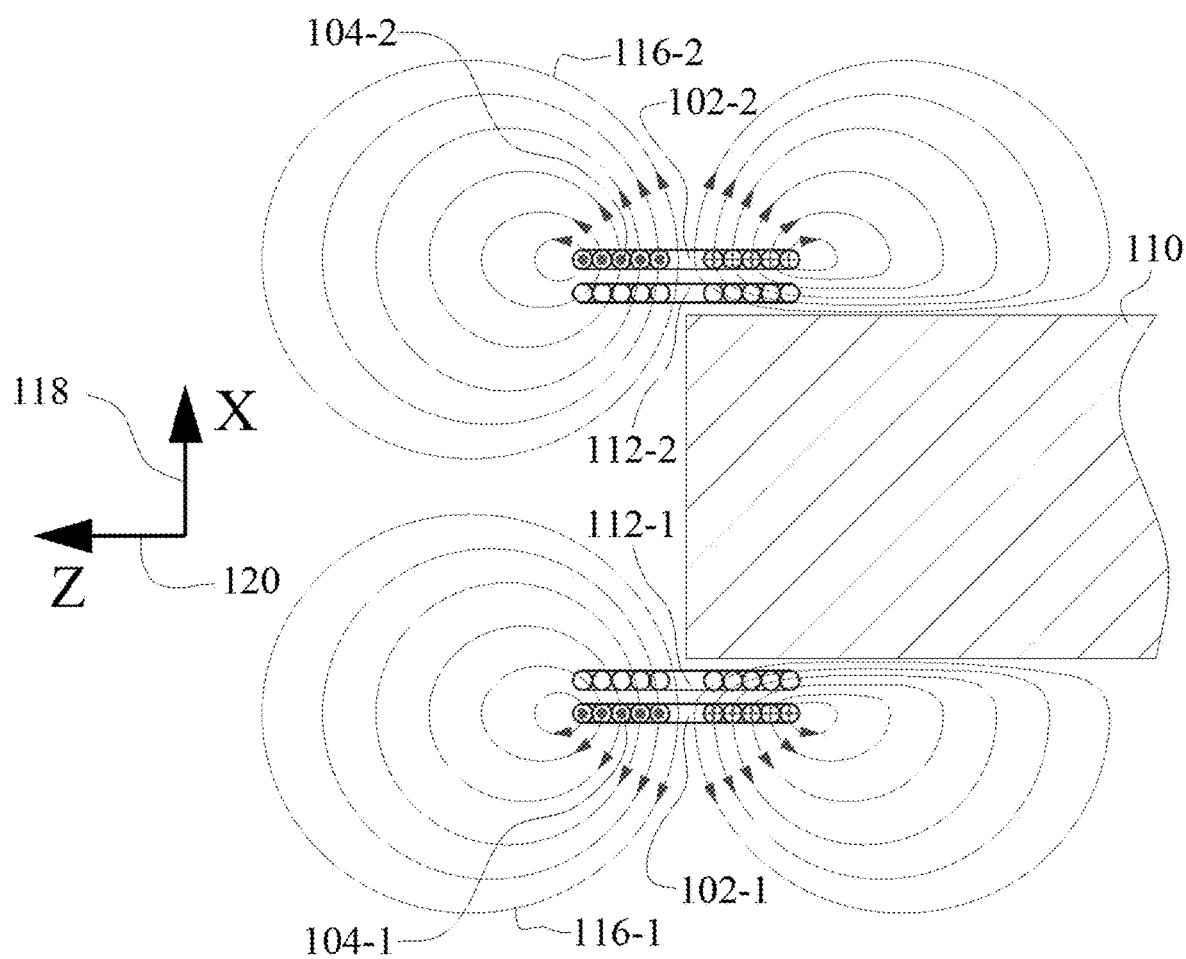
FIG. 5 is a schematic illustration of the operational principle of the improved version of the sensor arrangement shown in FIGS. 4A and 4B in which the requirement of maintaining the normal distance between the sensor and the target is removed.

The requirement of maintaining constant normal distance between the sensor target 110 and the sensing PCB coil 112 while measuring the sensor target displacements along the Z axis (120) in FIGS. 4A and 4B can be removed if two identical excitation-sensing PCB assemblies 102-1, 112-1 and 102-2 and 112-2 located on the opposite sides of the sensor target 110 along the X-axis are used as shown in FIG. 5. The sum of the voltages induced by time-varying magnetic fields 116-1 and 116-2 in the sensing PCB coils 112-1 and 112-2 can be used as a measure of the sensor target 110 displacement along the Z axis (120). By the sum of two sinusoidal voltages here and further throughout the text, the sum of either voltage amplitudes, or the values proportional to the amplitudes, such as Root Mean Square (RMS) values, is implied.

If the currents 104-1 and 104-2 in the excitation coils 102-1 and 102-2 are equal at any instance of time, which can be accomplished by simply wiring the excitation coils 102-1 and 102-2 in series, the summation of the voltages induced in sensing PCB coils 112-1 and 112-2 can also be accomplished by wiring these coils in series. Given the directions of the currents 104-1 and 104-2 in the excitation PCBs 102-1 and 102-2 after connecting those in series, the series connection of the sensing PCB coils 112-1 and 112-2 should be done so that the negative terminal of one of the coils is connected to the positive terminal of the other coil at any instance of the time when the currents 104-1 and 104-2 are not zero. This ensures that the voltages induced in the sensing PCB coils 112-1 and 112-2 are added instead of being subtracted at any instance of time. The voltage across two PCB sensing coils 112-1 and 112-2 connected in series in this case will be equal to the sum of the voltages induced in the individual coils 112-1 and 112-2 at any instance of time, and, consequently, the amplitude of the voltage across two PCB sensing coils 112-1 and 112-2 connected in series in this case will be equal to the sum of the amplitudes of the voltages induced in the individual coils 112-1 and 112-2.

The sum of the voltages induced in the sensing PCB coils 112-1 and 112-2 would change when the sensor target moves in the Z direction (120), because voltages induced in the individual coils 112-1 and 112-2 would change synchronously by approximately the same amount. On the other hand, the sum of the voltages induced in the sensing PCB coils 112-1 and 112-2 will not change much when the sensor target moves in the X (118) direction, because the individual voltages will change in the opposite directions by approximately the same amounts. For example, if the sensor target 110 moves in the positive X direction (closer to the sensing PCB coil 112-2 and further from the sensing coil 112-1) the voltage induced in the sensing PCB coil 112-2 would become smaller due to a reduction of the portion of the magnetic field 116-2 coupled to the sensing PCB coil 112-2, but the voltage induced in the sensing PCB coil 112-1 would become larger by approximately the same amount. As a result, the sum of the two voltages would remain approximately constant.

The arrangement shown in FIG. 5 can also be used to measure displacements of the sensor target 110 along the X-axis 118 if the difference between the voltages induced in the sensing PCB coils 112-1 and 112-2 is used as a measure of the target displacement. Contrary to the arrangement per FIGS. 1A and 1B and FIGS. 3A and 3B, the arrangement per FIG. 5 does not require the target surface to fully cover the footprints of the sensing PCBs 112-1 and 112-2 to avoid the sensor output dependence on the target displacement in the Z-direction (120) because such displacements would change the voltages induced in the sensing PCBs 112-1 and 112-2 in the same direction and by the same amount, resulting in nearly zero effect on the voltage difference. On the other hand, as discussed earlier, displacing the sensor target 110 in the X-direction (118) would change the difference between the voltages induced in the sensing PCB coils 112-1 and 112-2 because the individual voltages would change by approximately the same amounts but in the opposite directions.

To sum up, the arrangement shown in FIG. 5 allows measurements of the sensor target displacements in two mutually perpendicular direction: X (118) and Z (120) with the sum of the voltages induced in the sensing PCB coils 112-1 and 112-2 being used as a measure of the target displacements in the Z-direction (120) and the difference being used as a measure of the target displacements in the X-direction (118).

Figure 6:
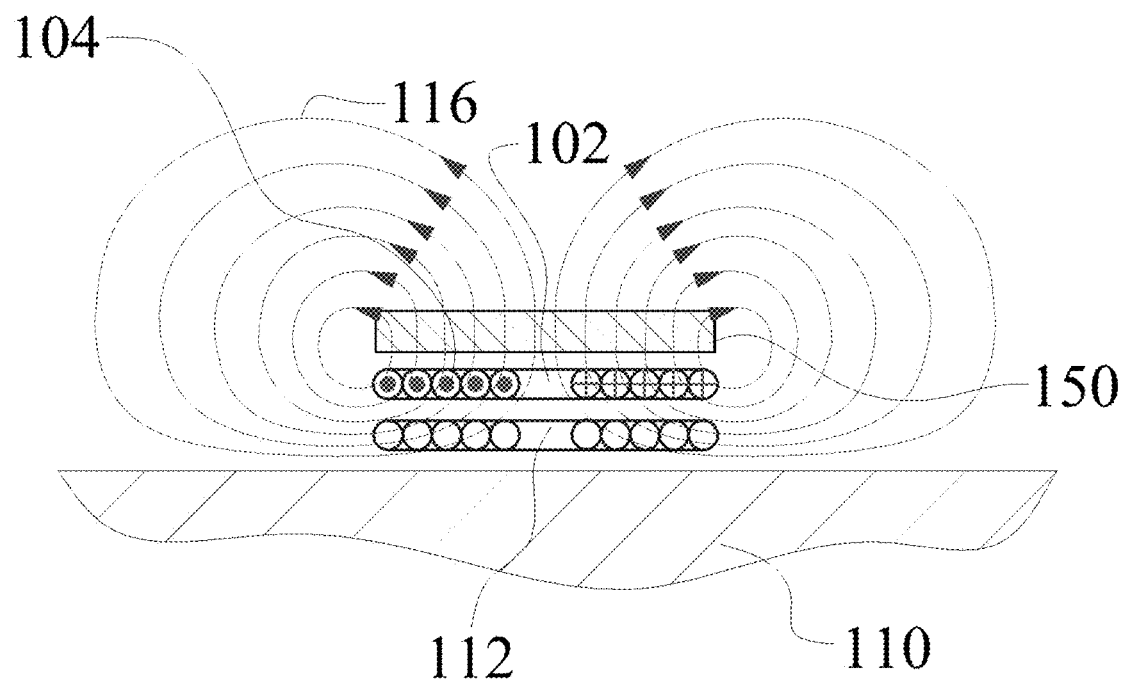
FIG. 6 is a schematic illustration of the operational principle of the position sensor per present disclosure with a soft-magnetic backiron added on the back of the excitation PCB coil.

FIG. 6 shows a design option when a soft-magnetic backiron 150 is added on the back of the excitation PCB coil 102 (the side of the excitation PCB coil 102 opposite to the sensing PCB coil 112 and the sensor target 110). High permeability of the soft-magnetic backiron 150 leads to the reduction of the magneto-motive force drop along the portion of the path of the magnetic field 116 located within the backiron 150, thus allowing the overall increase of the magnetic field 116 to be achieved without increasing the excitation current 104. This leads to improved sensor sensitivity to the changes in the position of the sensor target 110.

Considering that, without the backiron 150, the entire path of the magnetic field 116 lies in the air, which has the relative permeability of one, even modest increase of the permeability of the portion of the field path by introducing the backiron 150 may have a significant positive effect on the sensor sensitivity. This allows materials with relatively low permeability, but greater than the permeability of the air, be used in the backiron 150, such as a mix of an iron powder and a bonding agent (e.g. epoxy).

Figure 7:
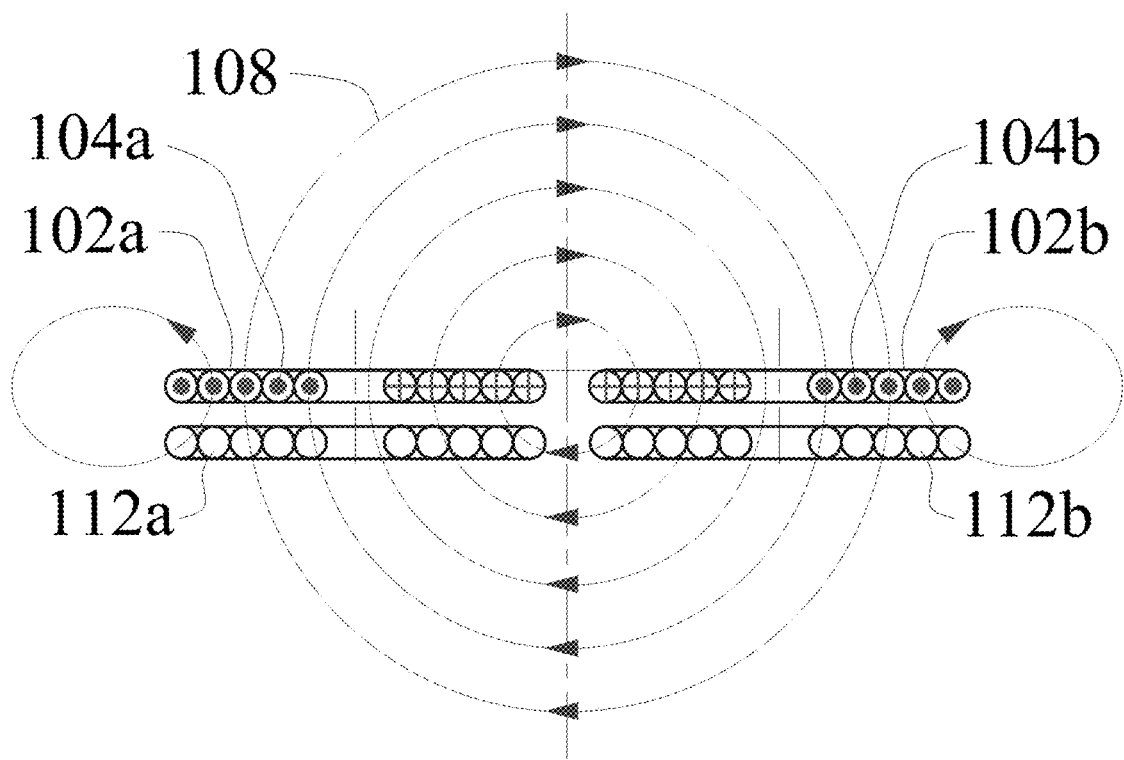
FIG. 7 is a schematic illustration of the operational principle of the position sensor per present disclosure with two excitation PCB coils located side-by side and energized with equal currents of opposite directions.

FIG. 7 shows a design option with two excitation-sensing PCB coil sets, 102a-112a and 102b-112b, located side by side. Two excitation PCB coil 102a and 102b in FIG. 7 are energized with excitation currents 104a and 104b having the same phase and amplitude but going in the opposite directions. This can be accomplished by wiring the excitation PCB coil 102a and 102b in series in such a way as to have the opposite directions of the currents 104a and 104b.

The voltages induced in two sensing PCB coils 112a and 112b have to be added and the resulting sum can be used as a measure of the sensor target position instead of a voltage from a single coil 112 as in FIGS. 1A through 6. The voltage summation can be achieved by wiring two sensing PCB coils 112a and 112b coils in series as described above with respect to FIG. 5.

The advantage of using the arrangement shown in FIG. 7 is that, in contrast to the single excitation—sensing PCB coil set, this arrangement produces the excitation magnetic field 108 which is confined to much smaller envelope in the proximity of the sensor. This increases the sensor sensitivity and also minimizes electromagnetic noises that could be induced in the neighboring equipment. The magnitude of the sensitivity increase is larger than just a factor of two which could have been expected from connecting two sensors in series: the voltage induced in each sensing PCB coil 112*a* and 112*b* will be larger than if the coil was coupled to a single excitation PCB coil (112*a* to 102*a* and 112*b* to 102*b*) because the magnetic field from the neighboring excitation coil will also add to the voltage induced in each sensing coil. For example, the voltage induced in the sensing PCB coil 112*a* by the magnetic field emanated from the excitation PCB coil 102*b* will add to the voltage induced by the magnetic field emanated from the excitation PCB coil 102*a*. Similarly, the voltage induced in the sensing PCB coil 112*b* by the magnetic field emanated from the excitation PCB coil 102*a* will add to the voltage induced by the magnetic field emanated from the excitation PCB coil 102*b*.

Figure 8:
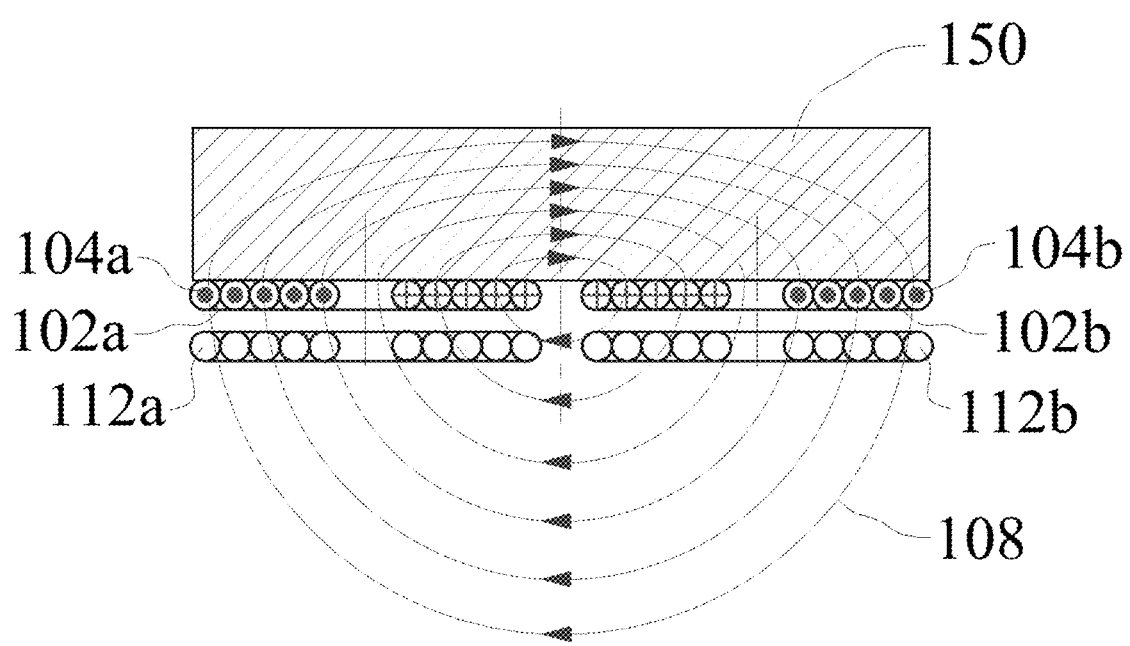
FIG. 8 is a schematic illustration of the operational principle of the position sensor per present disclosure with two excitation PCB coils located side-by side and energized with equal currents of opposite directions and a soft-magnetic backiron added on the back of the excitation PCB coils.

The sensor implementation shown in FIG. 8 is a combination of the solutions shown in FIGS. 6 and 7. FIG. 8 shows two excitation-sensing PCB coil sets 102*a*-112*a* and 102*b*-112*b* located side by side, further augmented with a common soft-magnetic backiron 150 added on the back of the excitation PCB coils 102*a* and 102*b* (the side of the excitation PCB coils 102*a* and 102*b* opposite to the sensing PCB coils 112*a* and 112*b*). The backiron 150 in this case provides a continuous reduced-reluctance path for the magnetic flux traveling between the excitation PCB coils 102*a* and 102*b*.

The sensor arrangement shown in FIG. 8 has the highest sensitivity to the displacements of the sensor target 110 (not shown) and the lowest amount of the electromagnetic interference with neighboring equipment because its excitation magnetic field 108 is concentrated in the area where the sensing PCB coils 112*a*, 112*b* and the sensor target 110 (not shown in FIG. 8 for clarity) are located.

In addition to the excitation PCB coil 102 and the sensing PCB coil 112 a position sensor also includes electronic means of inducing the excitation current 104 (sensor drive electronics) and electronic means of converting the sensor output high-frequency alternating voltage $U_{sens}$ (114) into the form of the output the end user needs such as DC voltage tracking the sensor target position (sensor signal processing electronics).

The sensor signal processing electronics does not have to be different from the electronics already used in similar positions sensors, but there are several complications with generating the excitation current 104 in the disclosed sensor, which are listed below.

1. A high excitation voltage is needed to induce the excitation current 104 for the following reasons:
   a. In order to have the net magnetic field 116 expelled from the sensor target 110 due to the skin effect as illustrated in FIGS. 1B, 3B, 4, 5 and 6, the frequency of the excitation magnetic field 108 (as well as the excitation current 104 causing it) f should be at least in order of 100-th of kHertz. The excitation voltage $U_{exc}$ (106) needed to produce the excitation current $I_{exc}$ (104) can be calculated as $$U_{exc} = Z I_{exc} \quad (1)$$

where $$Z = \sqrt{(\omega L_{exc})^2 + R_{exc}^2} \quad (2)$$

is the total electrical impedance of the excitation PCB coil 102, $L_{exc}$ and $R_{exc}$ are the inductance and the resistance of the excitation PCB coil 102 respectively, and $$\omega = 2\pi f \quad (3)$$

is the circular frequency of the excitation current $I_{exc}$ (104).
   Using equation (1), (2) and (3) one can see that the excitation voltage $U_{exc}$ (106) increases with the excitation frequency f.

b. Excitation coil made using Printed Circuit Board (PCB) technology has relatively high resistance $R_{exc}$ because of the limited thickness of the PCB traces. In more details, a practical position sensor should have a significant sensor raw gain $K_{sens}$ defined as the rate at which the amplitude of the sensor raw output voltage $U_{sens}$ 114 changes with the sensor target displacement x:

$$K_{sens} = \frac{dU_{sens}}{dx} \quad (4)$$

The sensor raw output voltage $U_{sens}$ 114 can be calculated as $$U_{sens} = \omega M_{sens} I_{exc} \quad (5)$$

where $M_{sens}$ is the mutual inductance between the excitation PCB coil 102 and the sensing PCB coil 112.
   Since the only parameter in (5) that changes when the sensor target moves is $M_{sens}$, the equation (4) becomes:

$$K_{sens} = \omega I_{exc} \frac{dM_{sens}}{dx} \quad (6)$$

Combining (1), (2) and (6) yields $$K_{sens} = \frac{1}{\sqrt{L_{exc}^2 + \left(\frac{R_{exc}}{\omega}\right)^2}} \frac{dM_{exc}}{dx} U_{exc} \quad (7)$$

Equation (7) shows that the larger $R_{exc}$ is, the larger $U_{exc}$ needs to be to have the same raw sensitivity of the sensor $K_{sens}$. The needed excitation voltage can be reduced by increasing the excitation circular frequency ω further above the minimum needed to have the total magnetic field 116 expelled from the sensor target 110, but this would significantly complicate the electronics design and would also increase the voltage drop on the impedances of the connecting cables which are not accounted for here.

2. The excitation coil resistance $R_{exc}$ changes with temperature causing the raw sensor gain $K_{sens}$ to change in accordance with the equation (7).

3. It is highly desirable for the waveform of the excitation current $I_{exc}$ 104 to be sinusoidal because non-sinusoidal waveforms would imply a broader current spectrum including higher-order harmonics, which would further increase the excitation voltage $U_{exc}$ (106) and the electromagnetic noise emitted by the sensor.

4. It is highly desirable for the waveforms of the excitation voltage $U_{exc}$ (106) and the output voltage $U_{sens}$ (114) to be sinusoidal because non-sinusoidal waveforms would imply a broader voltage spectrum including higher-order harmonics, which would require more complicated and expensive electronics to process them faithfully.

Figure 9:
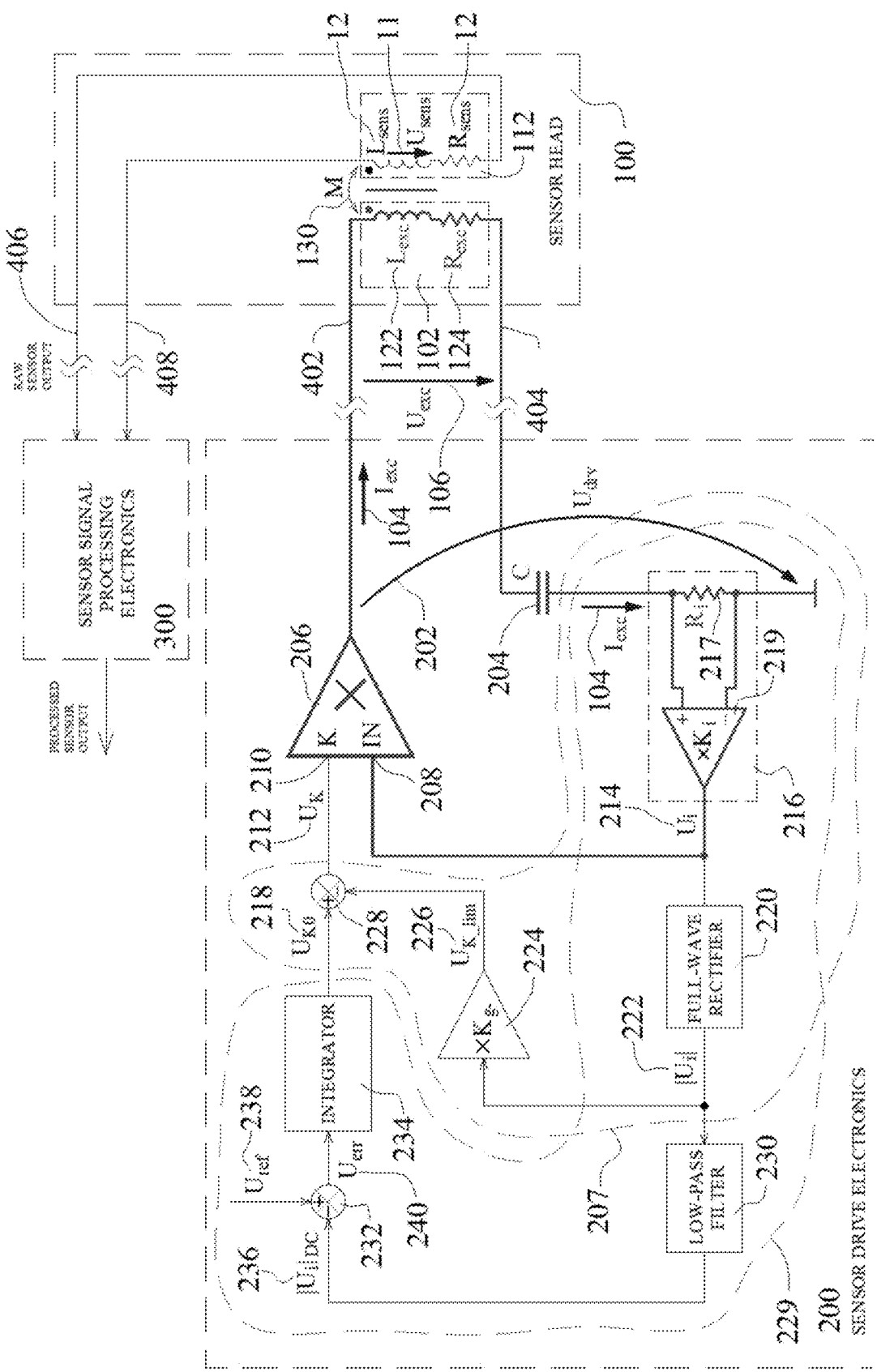
FIG. 9 is an example of an electrical schematic of the position sensor per present disclosure with the sensor drive electronics configured to maintain constant amplitude of the excitation current.

These complications are addressed in the sensor drive electronics 200, which structure is shown in FIG. 9. FIG. 9 also shows a sensor signal processing electronics 300 and an equivalent electrical schematic of a sensor head 100, which includes an excitation PCB coil 102 and a sensing PCB coil 112. The excitation PCB coil 102 is characterized by the inductance $L_{exc}$ 122 and the resistance $R_{exc}$ 124. Similarly, the sensing PCB coil 112 is characterized by the inductance $L_{sens}$ 126 and the resistance $R_{sens}$ 128. The excitation PCB coil 102 and the sensing PCB coil 112 are magnetically coupled through a mutual inductance M(130), which depends on the position of the sensor target 110. Terminals of the excitation coil 102 are connected to the sensor drive electronics 200 by means of wires 402 and 404. Similarly, terminals of the sensing coil 112 are connected to the sensor signal processing electronics 300 by wires 406 and 408.

The sensor drive electronics 200 shown in FIG. 9 utilizes properties of a series LCR circuit operating at its resonance frequency $f_0$ in order to apply a large sinusoidal excitation voltage $U_{exc}$ (106) to the terminals of the excitation PCB coil 102 and drive the sinusoidal excitation current $I_{exc}$ (104) large enough to obtain the needed sensor gain $K_{sens}$ while using a drive voltage $U_{drv}$ (202) applied to the LCR circuit, which is much smaller than the one that would be needed if the excitation PCB coil 102 was driven directly without the LCR circuit. The LCR circuit is formed by connecting a capacitor 204 in series with the excitation PCB coil 102. The sinusoidal drive voltage $U_{drv}$ (202) is generated by an adjustable-gain linear amplifier 206, which is depicted for illustration purposes as a multiplier with two inputs: signal input 208 and the gain input 210. The output of the adjustable-gain linear amplifier 210 is the drive voltage $U_{drv}$ (202), which is equal to the product of the amplifier gain $K_{amp}$, defined by the gain control voltage $U_K$ (212), and its input signal $U_i$ (214).

$$U_{drv} = K_{amp} U_i. \qquad (8)$$

In order to generate the excitation current $I_{exc}$ (104) at the resonance frequency of the LCR circuit, the LCR circuit is encompassed by a positive feedback with the drive voltage $U_{drv}$ (202) made proportional to the excitation current $I_{exc}$ (104). This is accomplished by measuring the excitation current $I_{exc}$ (104) with a current measuring device 216, which output is connected to the signal input 208 of the variable-gain linear amplifier 206.

The current measuring device 216 is shown in FIG. 9 for illustration purposes as consisting of a resistor $R_i$ (217) and an operational amplifier 219 with the amplification gain $K_{i\_amp}$. With this configuration the output voltage of the current measuring device 216 will be $U_i = K_{i\_amp} R_i I_{exc}$ and the gain of the entire current-measuring device 216 will be $K_i = K_{i\_amp} R_i$. The other implementations of the current-measuring device different from the one shown in FIG. 9 are possible, for example using a Hall-effect-based current probes to measure the excitation current $I_{exc}$ 104.

If the gain of the current measurement device 216 is $K_i$ and the gain of the adjustable-gain linear amplifier 206 is $K_{amp}$, the drive voltage on the output of the adjustable-gain linear amplifier will be $$U_{drv} = K_{amp} K_i I_{exc} \qquad (9)$$

As known from the electrical circuit theory, the resonance frequency of the series resonance LCR circuit is equal to $$f_0 = \frac{1}{2\pi\sqrt{LC}} \qquad (10)$$

where L is the total inductance of the series LCR circuit, which includes $L_{exc}$ (122) and any other inductance that can be added to the circuit, such as the inductance of the connecting cables 402 and 404.

The circular resonance frequency of the series LCR circuit, is $$\omega_0 = 2\pi f_0 = \frac{1}{\sqrt{LC}} \qquad (11)$$

It is also known from the electrical circuit theory that the impedance of the seral LCR circuit at it resonance frequency is simply equal to its resistance R, which includes $R_{exc}$ (124) and any other resistance that can be added to the circuit, such as the resistance of the connecting cables 402 and 404. Therefore, the excitation current $I_{exc}$ (104) can be calculated simply as $$I_{exc} = \frac{U_{drv}}{R}, \qquad (12)$$

which is a larger value than the one that could have been obtained if the excitation coil was driven directly without the capacitor 204 added. (In the latter case the circuit impedance would also include its inductive component and the current $I_{exc}$ would be equal to $$\frac{U_{drv}}{\sqrt{R^2 + (\omega L)^2}} \Bigg).$$

Because the excitation current $I_{exc}$ (104) and the drive voltage $U_{drv}$ (202) are linked by the equation (12), the open-loop gain of the positive-feedback loop including LCR circuit, current measuring device 216 and the variable-gain linear amplifier 206 can be calculated using equations (9) and (12) as $$K_{open\ loop} = \frac{K_{amp} K_i}{R}. \qquad (13)$$

If the open loop gain given by the equation (13) is greater than 1, once energized, the circuitry will start generating sinusoidal currents with ever increasing amplitudes until the voltage limits of the power supply powering the amplifier 206 (not shown) are reached.

To illustrate this, some initial value of the excitation current $I0_{exc}$ is assumed. After this value was measured by the current-measuring device 216 and amplified by the amplifier 206, the drive voltage on the output of the amplifier 206 $U0_{drv}$ will be given by the equation (8):

$$U0_{drv} = K_{amp} K_i I0_{exc}$$

This drive voltage will change the excitation current to the new value given by the equation (12):

$$I1_{exc} = \frac{U1_{drv}}{R} = \frac{K_{amp} K_i}{R} I0_{exc} = K_{open\ loop} I0_{exc}.$$

If the open-loop gain $K_{open-loop} > 1$, the new value the excitation current $I1_{exc}$ will be greater than the starting value $I0_{exc}$. Similarly, starting with the new value $I1_{exc}$ and going around the loop once again yields a new value $I2_{exc}$, which will be greater than $I1_{exc}$ and so on. In a summary, the excitation current $I_{exc}$ and all the voltages in the circuit will grow in time after powering the circuit until the voltage limits of the power supply powering the amplifier 206 are reached.

If the drive voltage $U_{drv}$ (202) waveform is allowed to grow until the power supply voltage limits are reached, it will not be sinusoidal anymore—the wave tops will be chopped-off. To avoid this and to control the amplitude of the $U_{drv}$ waveform while maintaining a more sinusoidal shape, a local current-limiting negative feedback 207 is introduced, which reduces the nominal gain $K_{nom}$ of the amplifier 206, defined by the nominal gain control voltage $U_{K0}$ (218) at the input 210, when the excitation current $I_{exc}$ 104 grows in absolute value. While different implementations of the local current-limiting negative feedback 207 are possible, in the example shown in FIG. 9 a full-wave rectifier 220 is used to obtain the absolute value $|U_i|$ (222) of the voltage $U_i$ (214) proportional to the current $I_{exc}$ 104, which is multiplied by a gain correction factor $K_{g-}$ (224) to produce a gain control limiting voltage $U_{K\_lim}$ (226), which is subsequently subtracted from the nominal gain control voltage $U_{K0}$ (218) at the node 228.

The nominal gain $K_{nom}$ of the amplifier 206, as defined by the nominal value of the gain control voltage $U_{K0}$ (218) at the amplifier input 210, is also adjusted to maintain a constant amplitude of the excitation current $I_{exc}$ 104 over time when, for example, the resistance of the excitation PCB coil $R_{exc}$ 124 changes with temperature. This is accomplished by using current-amplitude feedback control 229 which includes the current measuring device 216, the full-wave rectifier 220, low-pass filter 230, a signal node 232 and an integrator 234. The low-pass filter 230 is configured to extract a DC component of a rectified output of the current sensing device 216 $|U_i|_{DC}$ (236), which is used as a measure of the amplitude of the current sensing device output $U_{i0}$ because it is proportional to it with the proportionality coefficient $2/\pi$:

$$|U_i|_{DC} = \frac{2}{\pi} U_{i0} = \frac{2}{\pi} K_i I_{exc0}, \quad (14)$$

where $I_{exc0}$ is the amplitude of the excitation current $I_{exc}$ (104).
Therefore, by maintaining constant $|U_i|_{DC}$, constant amplitude of $U_i$ is maintained, and, consequently, the amplitude of the excitation current $I_{exc}$ 104.

Alternatively, other devices, such as peak detectors, can be used instead of the low-pass filter 230 to produce signals proportional to the amplitude of $U_i$.

The voltage characterizing the amplitude of the excitation current $I_{exc}$ 104 ($|U_i|_{DC}$ 236 in our example) is compared against the reference voltage $U_{ref}$ (238) at the signal node 232. The reference voltage $U_{ref}$ (238) is used to set the target value of the amplitude of the excitation current $I_{exc}$ 104. The difference between the two voltages produces an error signal $U_{err}$ (238):

$$U_{err} = U_{ref} - |U_i|_{DC}, \quad (15)$$

which is input into the integrator 234. The output of the integrator 234 is the nominal gain control voltage $U_{K0}$, which changes in time as follows $$U_{K0}(t) = U_{K0}(t_0) + \int_{t_0}^{t} K_{int} U_{err}(\tau) d\tau \quad (16)$$

where $U_{K0}(t_0)$ is the value if the nominal amplifier gain control voltage $U_{K0}$ (218) at the current time ($t_0$) and $K_{int}$ is the internal gain of the integrator 234.

If the current value of the $|U_i|_{DC}$ (236) is, for example, lower than the reference voltage $U_{ref}$ (238), the error voltage $U_{err}$ (240) will be positive (according to the equation (15)) and the value of the nominal amplifier gain control voltage $U_{K0}$ (218) will grow over time due to the time integral in the equation (16). The increase of $U_{K0}$ will cause the increase of the gain of the amplifier 206, and, subsequently, an increase of the excitation current $I_{exc}$ (104) until $|U_i|_{DC}$ becomes equal to $U_{ref}$, at which moment the further growth of the time integral in the equation (16) will stop.

Alternatively, if the current value of the $|U_i|_{DC}$ (236) is higher than the reference voltage $U_{ref}$ (238), the error voltage $U_{err}$ (240) will be negative (according to the equation (15)) and the value of the nominal amplifier gain control voltage $U_{K0}$ (218) will decrease over time due to the time integral in the equation (16). The decrease of $U_{K0}$ will cause the decrease of the gain of the amplifier 206, and, subsequently, a decrease of the excitation current $I_{exc}$ (104) until $|U_i|_{DC}$ becomes equal to $U_{ref}$, at which moment the further decrease of the time integral in the equation (16) will stop.

Figure 10:
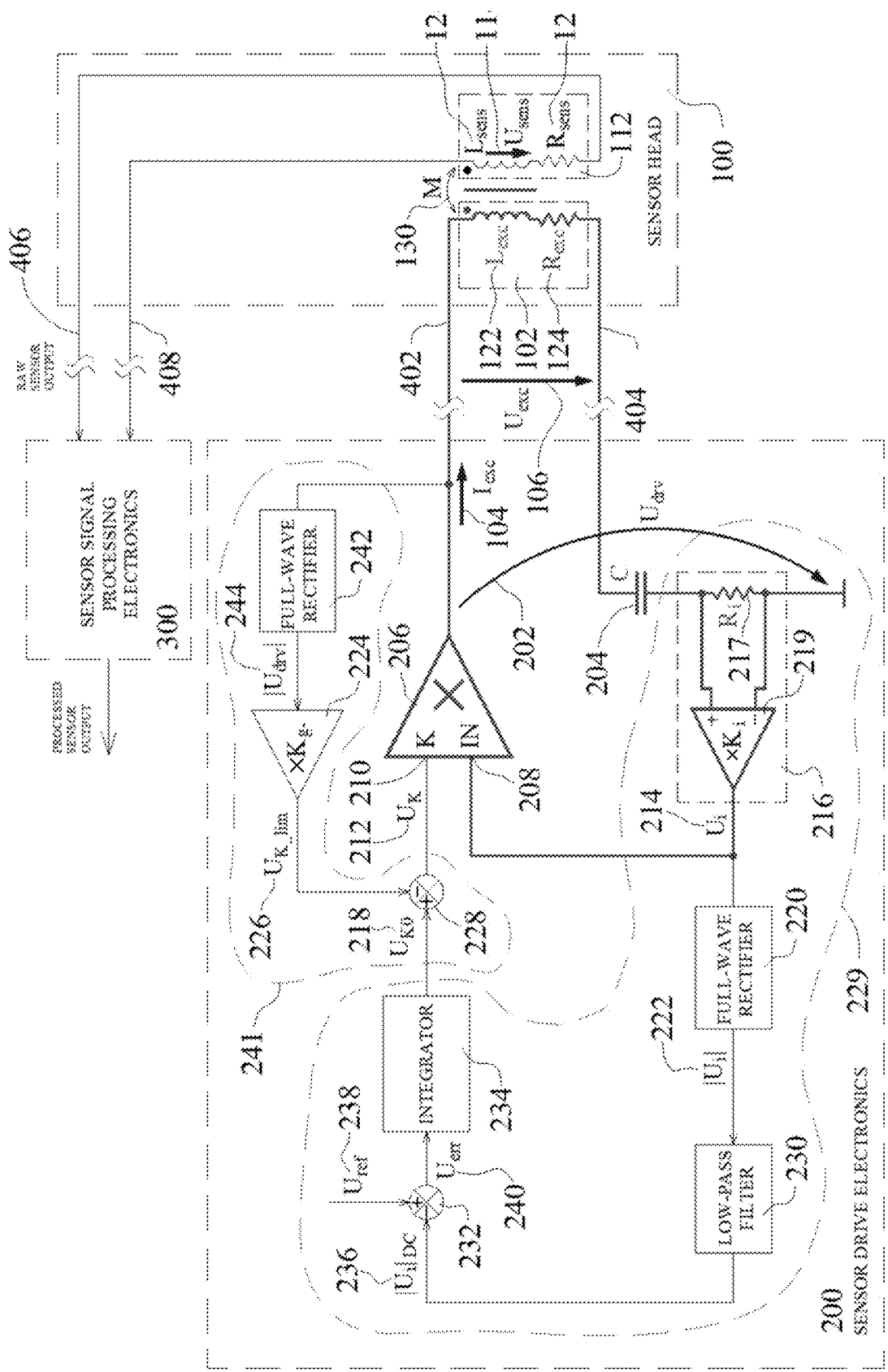
FIG. 10 is an alternative example of an electrical schematic of the position sensor per present disclosure with the sensor drive electronics configured to maintain constant amplitude of the excitation current.

FIG. 10 shows a solution for the sensor drive electronics 200 similar to FIG. 9 but featuring a slightly different implementation of the current-limiting negative feedback 241: the reduction of the gain of the amplifier 206 is driven not by the increase of the $|U_i|$ (222), but by the increase of the absolute value of the amplifier output voltage $|U_{dr}|$ (244). Because $U_{dr}$ and $I_{exc}$ (and therefore $U_i$, which is proportional to $I_{exc}$) are linked together by the equation (12), this approach is effectively equivalent to the approach discussed earlier with respect to FIG. 9. In the example shown in FIG. 10 a full-wave rectifier 242 is used to obtain the absolute value $|U_{dr}|$ (244) of the output voltage $U_{dr}$ (202) of the amplifier 206, which is multiplied by a gain correction factor $K_{g-}$ (224) to produce a gain control limiting voltage $U_{K\_lim}$ (226) and then subtracted from the nominal gain control voltage $U_{K0}$ (218) at the node 228. Except for this difference, the sensor drive electronics 200 shown in FIG. 10 is identical to that shown in FIG. 9.

In contrast to FIG. 9, the design option shown in FIG. 10 requires a separate full-wave rectifier 242 for limiting the excitation current amplitude in addition to the full-wave rectifier 220, but may be easier to implement in some applications.

It can be noticed that the sensor drive electronics shown in FIGS. 9 and 10 are configured to maintain the constant amplitude of the excitation current $I_{exc}$ (104), whereas the equation (6) states that the raw sensor gain $K_{sens}$ depends on the product $\omega I_{exc}$. If $I_{exc0}$ is the amplitude of the excitation current $I_{exc}$ (104), then $\omega I_{exc0}$ is the amplitude of the time derivative of $I_{exc}$. Variations of the $I_{exc}$ are normally the main potential source of the sensor inaccuracies, because $I_{exc}$ depends on the net resistance R of the LCR circuit (see equation 12), including, in particular, the resistance of the excitation PCB coil $R_{exc}$ (124) and the resistance of the connecting wires 402 and 404, which may change with temperature.

As has been shown earlier, the amplitude of the excitation current $I_{exc}$ in the sensor drive electronics 200 per FIGS. 9 and 10 is maintained constant regardless of the net resistance R of the LCR circuit by using the current-amplitude feedback control 229. The current-amplitude feedback control 229 does not, however, has any effect on the second multiplier in the equation (6)—the operational circular frequency of the sensor ω, which is equal to the resonance circular frequency of the LCR circuit coo given by the equation (11) in this design.

Contrary to $I_{exc}$, $\omega_0$ is independent of the LCR circuit resistance R. It is, however, dependent on two other parameters of the LCR circuit: inductance L and capacitance C. Neither of those parameters normally change with temperature, and simply maintaining the amplitude of $I_{exc}$ using the current-amplitude feedback control 229 is often enough to have sufficiently stable sensor gain. However, L and C may vary from device to device due to the part parameter variations and may also vary when modifications are made to the device, for example when the connecting cables 402 get longer or shorter, get coiled or stretched, etc. In order to have a more consistent sensor gain, it is desirable to maintain a constant amplitude of the product $\omega I_{exc}$ rather than $I_{exc}$ alone. This is achieved in the circuits shown in FIGS. 11 and 12.

Figure 11:
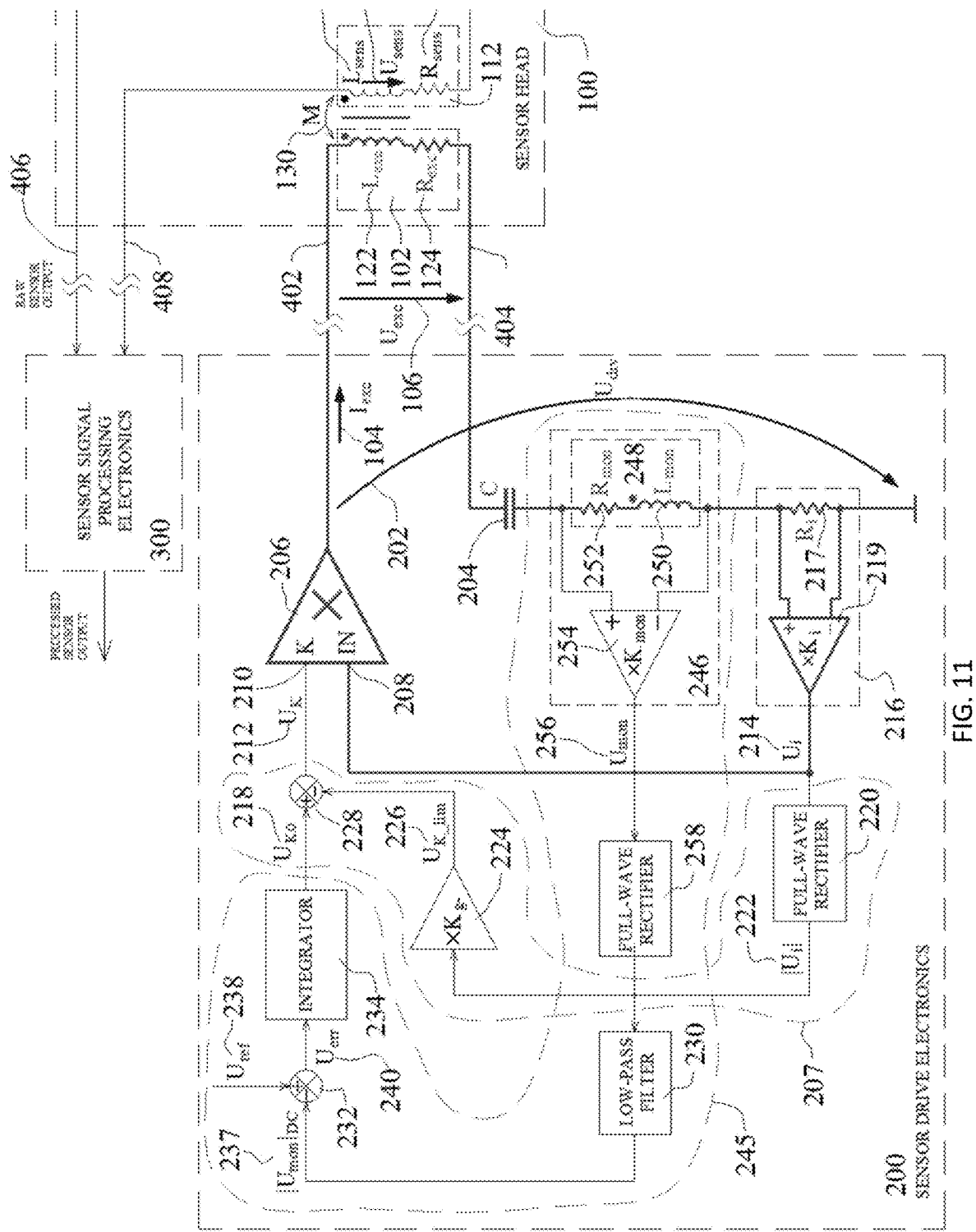
FIG. 11 is an example of an electrical schematic of the position sensor per present disclosure with the sensor drive electronics configured to maintain constant amplitude of the time derivative of the excitation current by monitoring voltage across an inductance connected in series with excitation PCB coil of the sensor.
Figure 12:
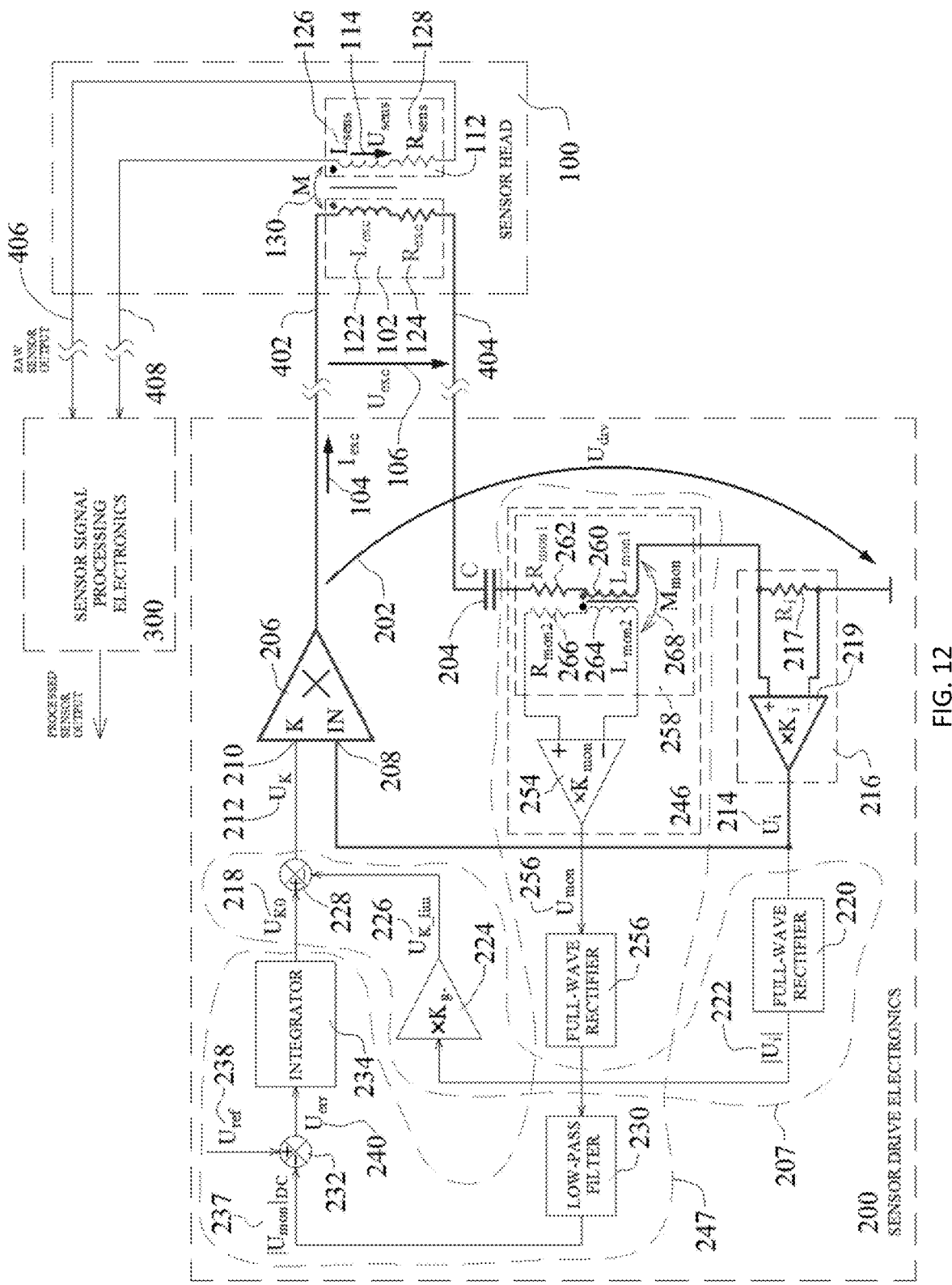
FIG. 12 is an example of an electrical schematic of the position sensor per present disclosure with the sensor drive electronics configured to maintain constant amplitude of the time derivative of the excitation current by monitoring voltage across the secondary winding of a high-frequency transformer, which primary winding is connected in series with excitation PCB coil of the sensor.

The circuits shown in FIGS. 11 and 12 are similar to the circuit shown in FIG. 9, but they utilize current-time-derivative-amplitude feedback controls 245 and 247 respectively instead of the current-amplitude feedback control 229 shown in FIG. 9. The current-time-derivative-amplitude feedback controls 245 and 247 are configured to keep constant the amplitude of the voltage on the output of the ωI-measuring devices 246 configured to monitor products $\omega \cdot I_{exc}$, where ω's are circular frequencies of the excitation currents $I_{exc}$, equal to the resonance circular frequencies of the LCR circuits $\omega_0$. Because the amplitude of a time derivative of a sinusoidal current $I_{exc}$ is equal to $\omega \cdot I_{exc0}$, where $I_{exc0}$ is the amplitude of the current $I_{exc}$, the ωI-measuring device 246 can be said to measure the amplitude of the time derivative of the current $I_{exc}$.

The difference between two current-time-derivative-amplitude feedback controls 245 and 247 shown in FIGS. 11 and 12 respectively is in how the ωI-measuring devices 246 are implemented. Otherwise, their operational principles are identical and similar to that of the current-amplitude feedback controls 229 shown in FIGS. 9 and 10 except that the feedback controls are configured to maintain constant amplitudes of $\omega I_{exc}$ rather than $I_{exc}$ alone.

The ωI-measuring devices 246 shown in the sensor drive circuits 200 in FIGS. 11 and 12 generate voltages $U_{mon}$ 256 proportional to the products $\omega \cdot I_{exc}$. A voltage $|U_{mon}|_{DC}$ (237) proportional to the amplitude of the voltage $U_{mon}$ (256) is extracted using a full-wave rectifier 258 and a low-pass filter 230 and then compared against the reference voltage $U_{ref}$ (238) at the node 232.

Alternatively, other devices, such as peak detectors, can be used instead of the full-wave rectifier 258 and the low-pass filter 230 to produce signals proportional to the amplitude of $U_{mon}$.

The reference voltage $U_{ref}$ (238) is used to set the target value of the products $\omega \cdot I_{exc}$. The difference between the two voltages produces an error signal $U_{err}$ (240):

$$U_{err} = U_{ref} - |U_{mon}|_{DC}, \qquad (17)$$

which is input into the integrator 234. The output of the integrator 234 is the nominal gain control voltage $U_{K0}$ (218), which changes in time in accordance with the equation (16) above.

If the current value of the $|U_{mon}|_{DC}$ (237) is, for example, lower than the reference voltage $U_{ref}$ (238), the error voltage $U_{err}$ (240) will be positive (according to the equation (17)) and the value of the nominal amplifier gain control voltage $U_{K0}$ (218) will grow over time due to the time integral in the equation (16). The increase of $U_{K0}$ will cause the increase of the gain of the amplifier 206, and, subsequently, an increase of the excitation current $I_{exc}$ (104) until $|U_{mon}|_{DC}$ becomes equal to $U_{ref}$ at which moment the further growth of the time integral in the equation (16) will stop.

Alternatively, if the current value of the $|U_{mon}|_{DC}$ (237) is higher than the reference voltage $U_{ref}$ (238), the error voltage $U_{err}$ (240) will be negative (according to the equation (17)) and the value of the nominal amplifier gain control voltage $U_{K0}$ (218) will decrease over time due to the time integral in the equation (16). The decrease of $U_{K0}$ will cause the decrease of the gain of the amplifier 206, and, subsequently, a decrease of the excitation current $I_{exc}$ (104) until $|U_{mon}|_{DC}$ becomes equal to $U_{ref}$, at which moment the further decrease of the time integral in the equation (16) will stop.

As the ωI-measuring devices 246, the circuit shown in FIG. 11 utilizes a monitoring inductor 248 connected in series with the original LCR circuit. The inductor 248 is characterized by its inductance $L_{mon}$ (250) and resistance $R_{mon}$ (252). When the excitation current $I_{exc}$ (104) flows through the inductor 248, a voltage drop develops across the inductor equal in amplitude to $I_{exc}\sqrt{(\omega L_{mon})^2 + R_{mon}^2}$, which gets multiplied by the gain of the differential operational amplifier 254 to produce $U_{mon}$ equal to $$U_{mon} = K_{mon}\sqrt{(\omega L_{mon})^2 + R_{mon}^2}\, I_{exc}. \qquad (18)$$

If the resistance $R_{mon}$ of the monitoring inductor 248 is much smaller than its inductive component of the impedance at the operating frequency ω equal to $\omega L_{mon}$, the equation (18) reduces to $$U_{mon} = (K_{mon} L_{mon})\omega I_{exc}. \qquad (19)$$

Therefore, subject to the requirement that $R_{mon} \ll \omega L_{mon}$, the output voltage of the ωI-measuring device 246 shown in FIG. 11 is proportional to $\omega I_{exc}$, as required.

An alternative implementation of the ωI-measuring devices 246, illustrated in FIG. 12, does not need the requirement $R_{mon} \ll \omega L_{mon}$ to produce $U_{mon}$ proportional to $\omega I_{exc}$. Instead of the monitoring inductor 248 the ωI-measuring devices 246 shown in FIG. 12 uses a high-frequency monitoring transformer 258, which primary winding is connected in series with the original LCR circuit similar to how the monitoring inductor 248 was connected in FIG. 11. The secondary winding of the monitoring transformer 258 is connected to the inputs of the operational amplifier 254. The primary winding of the monitoring transformer 258 is characterized by the inductance $L_{mon1}$ (260) and the resistance $R_{mon1}$ (262). Similarly, the secondary winding of the monitoring transformer 258 is characterized by the inductance $L_{mon2}$ (264) and the resistance $R_{mon2}$ (266). The primary and the secondary transformer windings are magnetically coupled, with the amount of coupling characterized by the mutual inductance $M_{mon}$ (268).

When alternating excitation current $I_{exc}$ flows through the primary winding of the monitoring transformer 258, it induces alternating voltage across the secondary winding equal to $M_{mon}\omega I_{exc}$. Because of the high input impedance of the operational amplifier 254, there will be no current in the secondary winding of the transformer 258, and, therefore, there will be no voltage drop across the winding resistance $R_{mon2}$ (266) and the entire voltage $M_{mon}\omega I_{exc}$ induced on the secondary winding will be applied to the input of the amplifier 254. Consequently, the amplifier output $U_{mon}$ (254) will be equal to $$U_{mon} = K_{mon} M_{mon} \omega I_{exc} \qquad (20)$$

The output voltage of the $\omega$I-measuring device 246 shown in FIG. 12 is proportional to $\omega I_{exc}$, as required.

One of the advantages of using PCB technology for making the excitation and sensing coils is that the PCB can use flexible substrates, such as Kapton, which makes them flexible. Flexible PCB coils can be formed to follow the profiles of the sensor targets closely and maintain a constant small gap between the sensing coils and the target. This allows maximizing sensor sensitivities to the target displacements in cases when the target surfaces are not flat.

Figure 13:
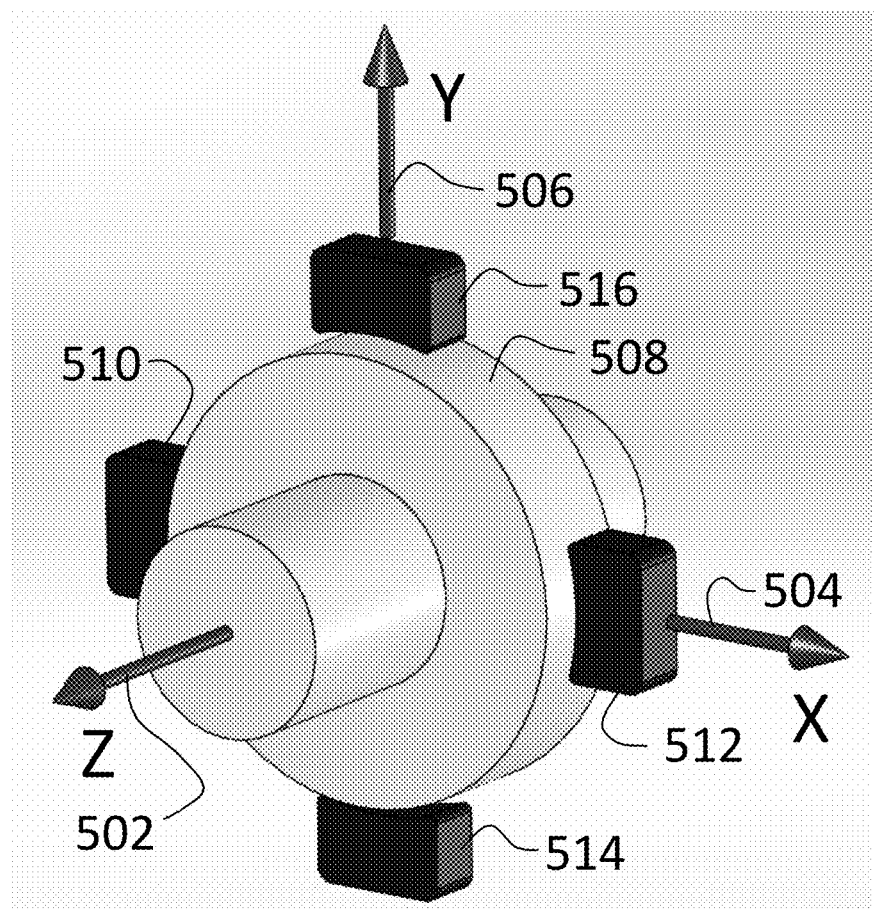
FIG. 13 is a schematic diagram of the position sensor per present disclosure configured to measure radial displacements of a cylindrical sensor target.

As an example, FIG. 13 shows application of the disclosed position sensor technology to measurements of radial displacements of a rotational target 508. The sensor arrangement shown in FIG. 13 consists of four sensor heads 510, 512, 514 and 516 placed around and proximate to the outer cylindrical surface of the sensor target 508 without coming to a mechanical contact with it. Each of the four sensor heads comprises an excitation PCB coil and a sensing PCB coil such as shown in FIGS. 1A-1B, 3A-3B, 6 and 8 but made using flexible PCB technology to follow the profile of the outer cylindrical surface of the sensor target 508. The excitation and sensing PCB coils within each sensor head are located adjacent to the outer cylindrical surface of the sensor target 508 and shaped to maintain a constant distance from this surface. The outer cylindrical surface of the sensor target 508 extends axially beyond the envelopes of the sensor heads 510, 512, 514 and 516 in order to avoid effects of the axial movements of the sensor target 508 on the sensor readings.

Two sensor heads 510 and 512 in FIG. 13 located diametrically opposite from each other along the X-axis 504 are used to measure the displacements of the rotational sensor target 508 along the X axis 504, whereas the sensor heads 514 and 516 located diametrically opposite from each other along the Y-axis 506 are used to measure the displacements of the rotational sensor target 508 along the Y axis 506.

In principle only one sensor head can be used to measure the sensor target 508 displacement along a particular axis, for example only sensor head 512 can be used to measure target displacements along the X axis and only sensor head 516 can be used to measure the displacements along the Y-axis.

The advantage of using two diametrically opposite sensor heads with the difference between the voltages induced on their sensing coils being used as a measure of the target displacement is that it allows eliminating effects of the factors that change the voltages induced in each of the sensing coils by the same amount, because those changes will cancel out when the voltages are subtracted.

For example if the temperature change causes the mechanical support of the sensor head 512 to deform due to the presence of different materials with different thermal expansion coefficients in its structure, the sensor head 512 may move either further away or closer to the sensor target 508. Based on the sensor readings, an observer would conclude that the sensor target 508 has moved from the desirable location in space, even though in reality it was the sensor head 512 that moved.

This error, however, could be prevented if an identical sensor head 510 was placed diametrically opposite from the sensor head 512 as shown in FIG. 13 and the difference between the voltages from the sensing PCB coils within the sensor heads 510 and 512 was used to measure the displacements of the sensor target 508, assuming that both sensor heads 510 and 512 are identical, mounted in the same way and exposed to the same temperatures, as normally would be the case in rotating machines. When the temperature changes, both sensor heads 510 and 512 would move either closer to the sensor target 508 or further away from it by the same amount and the changes of the voltages from the sensing PCB coils of the two sensor heads would cancel out during the subtraction.

Figure 14:
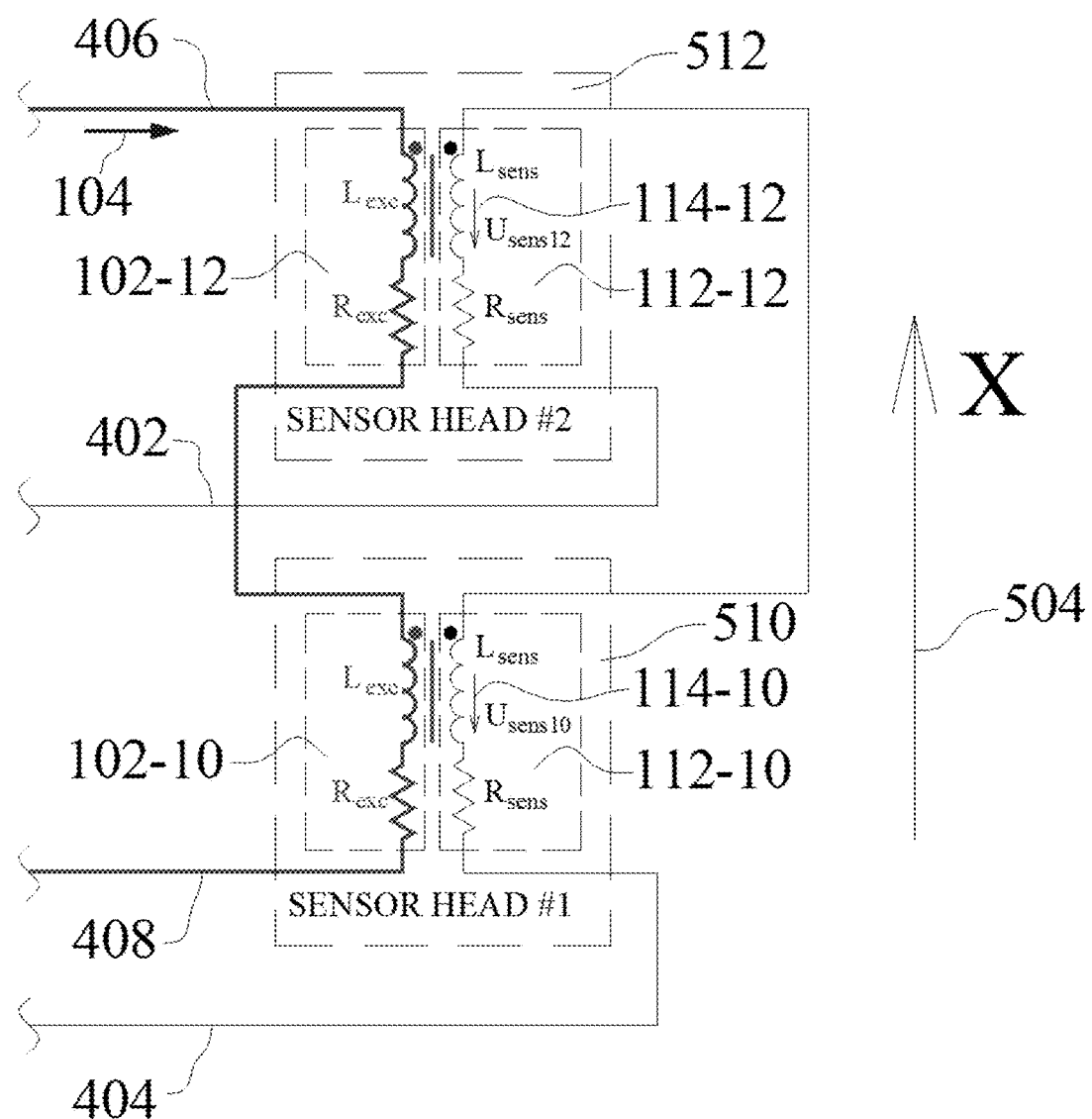
FIG. 14 is an example of an electrical wiring diagram for two diametrically-opposed sensor heads located along the X-axis in FIG. 13.

FIG. 14 shows a schematic diagram of electrical interconnections between the sensor heads 510 and 512. The sensor head 510 comprises an excitation PCB coil 102-10 and a sensing PCB coil 112-10. The sensor head 512 comprises an excitation PCB coil 102-12 and a sensing PCB coil 112-12. Each of the coils 102-10, 112-10, 102-12 and 112-12 can be either a separate coil or a composite coil such as shown in FIGS. 7 and 8 when the excitation PCB coils and the sensing PCB coils are composed of two coils: 102a,b and 112a,b respectively. The construction of the sensor 510, however, should be fully identical to the constructions of the sensor 512.

If both excitation PCB coils 102-10 and 102-12 are energized with the excitation currents of the same amplitudes, the difference between the voltages $U_{sens10}$ (114-10) and $U_{sens12}$ (114-12) induced in the sensing PCB coils 112-10 and 112-12 respectively can be used as a measure of the sensor target 508 displacement in the X-direction 504. The difference between the voltages $U_{sens10}$ (114-10) and $U_{sens12}$ (114-12) here implies either the difference in amplitudes of two sinusoidal voltages $U_{sens10}$ (114-10) and $U_{sens12}$ (114-12), or difference in their RMS values, which are proportional to the amplitudes, or any other values, which are proportional to the amplitudes.

If the excitation currents in the excitation PCB coils 102-10 and 102-12 are not only equal in amplitudes, but also equal at any instance of time, which can be accomplished by simply wiring the excitation coils 102-10 and 102-12 in series, the subtraction of the voltages induced in sensing PCB coils 112-10 and 112-12 can also be accomplished by simply wiring these coils in series as shown in FIG. 14. Given the directions of the currents in the excitation PCBs 102-10 and 102-12 after connecting those in series, the series connection of the sensing PCB coils 112-10 and 112-12 should be done so that two terminals of two coils having the same polarity at any instance of the time when the voltages in the coils are not zeros are connected together (for example the negative terminal from one coil is connected to the negative terminal from the other coil, or the positive terminal from one coil is connected to the positive terminal from the other coil). This ensures that the voltages $U_{sens10}$ and $U_{sens12}$ are subtracted from each other at any instance of time instead of being added to each other.

When the sensor target 508 moves, for example, in the positive X direction, it gets closer to the sensor head 512, reducing the amplitude of the sensing voltage $U_{sens12}$ (114-12) induced in the sensing PCB coil 112-12 due to the excitation magnetic field being more suppressed by the eddy-currents in the portion of the sensor target 508 close to the sensor head 512. On the other side, a displacement in the positive X direction will move the sensor target 508 further away from the sensor head 510, increasing the amplitude of the sensing voltage $U_{sens10}$ (114-10) induced in the sensing PCB coil 112-10 due to the weakening of the eddy-currents in the portion of the sensor target 508 close to the sensor head 510.

Figure 15:
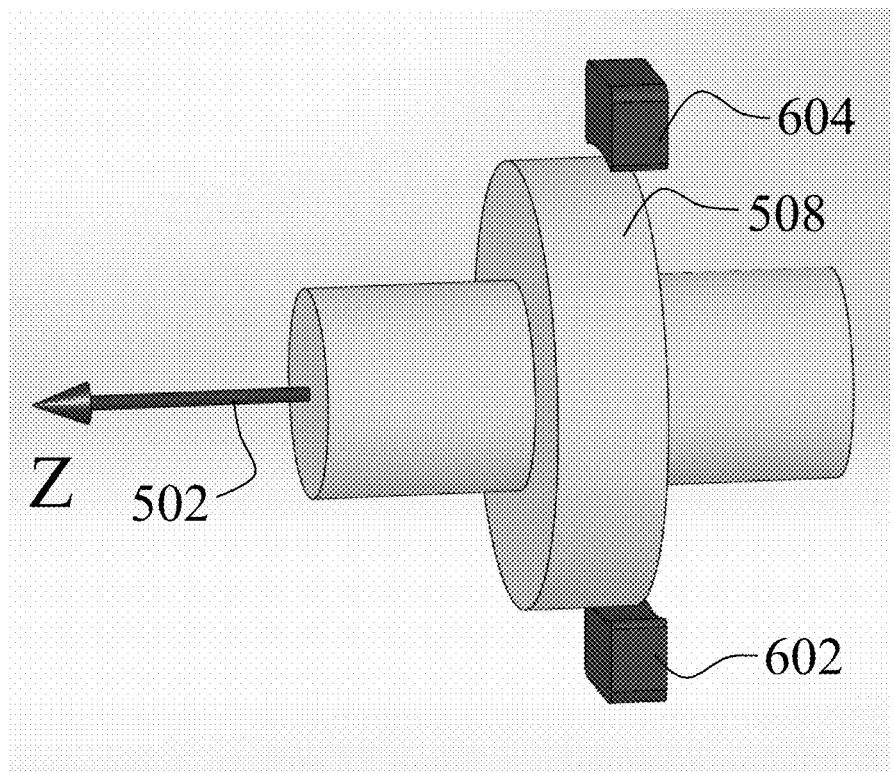
FIG. 15 is a schematic diagram of the position sensor per present disclosure configured to measure axial displacements of a cylindrical sensor target.

FIG. 15 shows an arrangement in which two sensor heads 602 and 604, similar in construction to the sensor heads 510, 512, 514 and 516 shown in FIG. 13, are used to measure axial displacements of the rotational sensor target 508 along the Z-axis 502. The sensor heads 602 and 604 are positioned on the edge of the sensor target 508 so that the amount of overlap between the outer cylindrical surface of the target 508 and the sensing PCB coils located at the inner diameters of the sensor heads change when the sensor target moves along the Z-axis 502. Two diametrically opposite sensor heads instead of a single sensor head are needed to mitigate effects of the sensor target radial displacements on the Z-position readings similar to how it was done in the system shown in FIG. 5 to mitigate errors of the displacements along the X-axis 118 on the readings of the displacements along the Z-axis 120.

Figure 16:
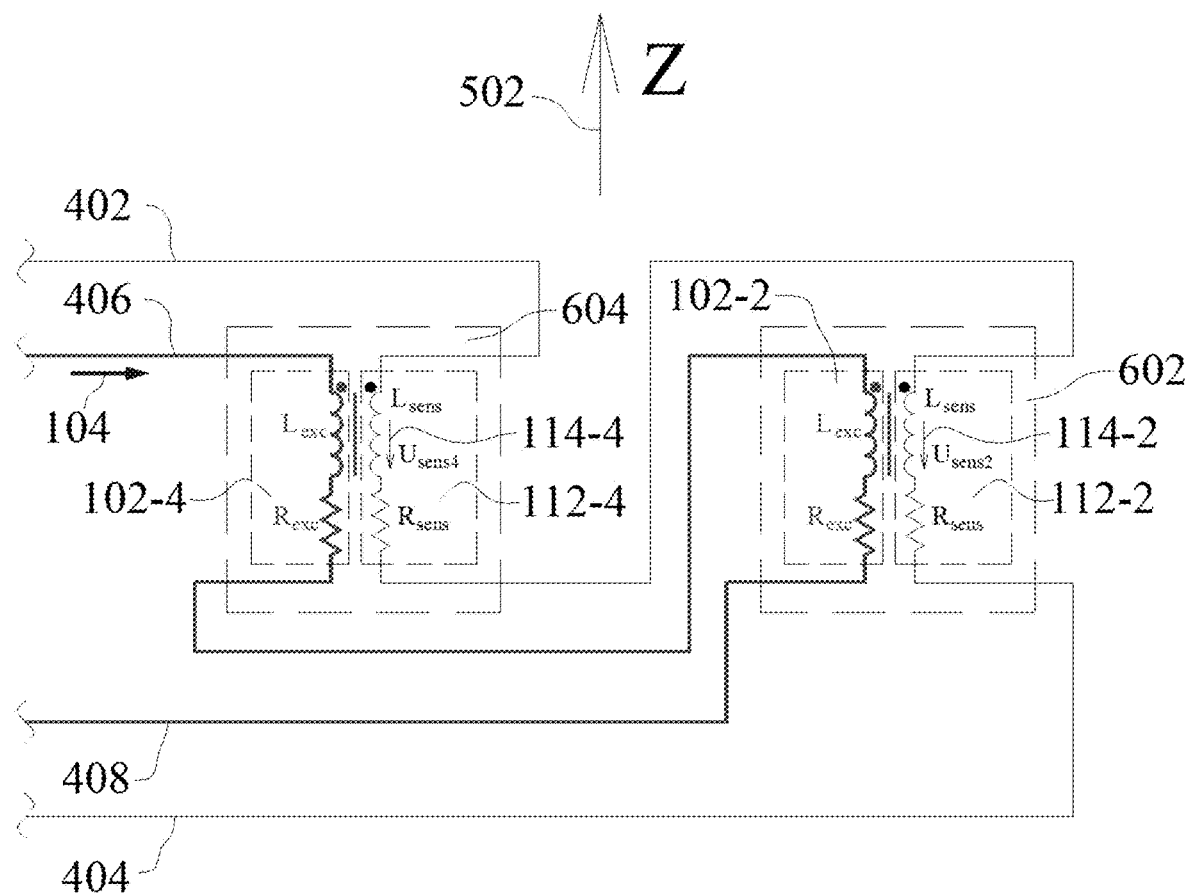
FIG. 16 is an example of an electrical wiring diagram for two sensor heads shown in FIG. 15.

FIG. 16 shows a schematic diagram of electrical interconnections between the sensor heads 602 and 604. The sensor 602 comprises an excitation PCB coil 102-2 and a sensing PCB coil 112-2. The sensor 604 comprises an excitation PCB coil 102-4 and a sensing PCB coil 112-4. Each of the coils 102-2, 112-2, 102-4 and 112-4 can be either a separate coil or a composite coil such as shown in FIGS. 7 and 8 when the excitation PCB coils and the sensing PCB coils are shown composed of two coils: 102a,b and 112a,b respectively. The construction of the sensor 602, however, should be fully identical to the constructions of the sensor 604.

If both excitation PCB coils 102-2 and 102-4 are energized with the excitation currents of the same amplitudes, the sum of the voltages $U_{sens2}$ (114-2) and $U_{sens4}$ (114-4) induced in the sensing PCB coils 112-2 and 112-4 can be used as a measure of the sensor target 508 displacement in the Z-direction 502. The sum here implies that either amplitudes of two sinusoidal voltages $U_{sens2}$ (114-2) and $U_{sens4}$ (114-4) are added, or their RMS values are added (which are proportional to the amplitudes), or any other values proportional to the amplitudes are added.

If the excitation currents in the excitation PCB coils 102-2 and 102-4 are equal at any instance of time, which can be accomplished by simply wiring the excitation coils 102-2 and 102-4 in series, the summation of the voltages induced in sensing PCB coils 112-2 and 112-4 can also be accomplished by wiring these coils in series. Given the directions of the currents in the excitation PCBs 102-2 and 102-4 after connecting those in series, the series connection of the sensing PCB coils 112-2 and 112-4 should be done so that the negative terminal of one of the coils is connected to the positive terminal of the other coil at any instance of the time when the voltages in the coils are not zeros. This ensures that the voltages 114-2 and 114-4 induced in the sensing PCB coils 112-2 and 112-4 are added instead of being subtracted at any instance of time. The voltage across two PCB sensing coils 112-2 and 112-4 connected in series in this case will be equal to the sum of the voltages induced in the individual coils 112-2 and 112-4 at any instance of time, and, consequently, the amplitude of the voltage across two PCB sensing coils 112-2 and 112-4 connected in series in this case will be equal to the sum of the amplitudes of the voltages induced in the individual coils 112-2 and 112-4.

The sum of the voltages induced in the sensing PCB coils 112-2 and 112-4 would change when the sensor target moves in the Z direction (502), because voltages induced in the individual coils 112-2 and 112-4 would change synchronously by approximately the same amount. On the other hand, the sum of the voltages induced in the sensing PCB coils 112-2 and 112-4 will not change much when the sensor target moves in the radial direction along the diagonal connecting two sensor heads, because the individual voltages will change in the opposite directions by approximately the same amounts. For example, if the sensor target 508 moves closer to the sensing PCB coil 112-4 and further from the sensing coil 112-2, the voltage induced in the sensing PCB coil 112-4 would become smaller due to a reduction of the portion of the magnetic field coupled to the sensing PCB coil 112-4, but the voltage induced in the sensing PCB coil 112-2 would become larger by approximately the same amount. As a result, the sum of the two voltages would remain approximately constant.

Figure 17:
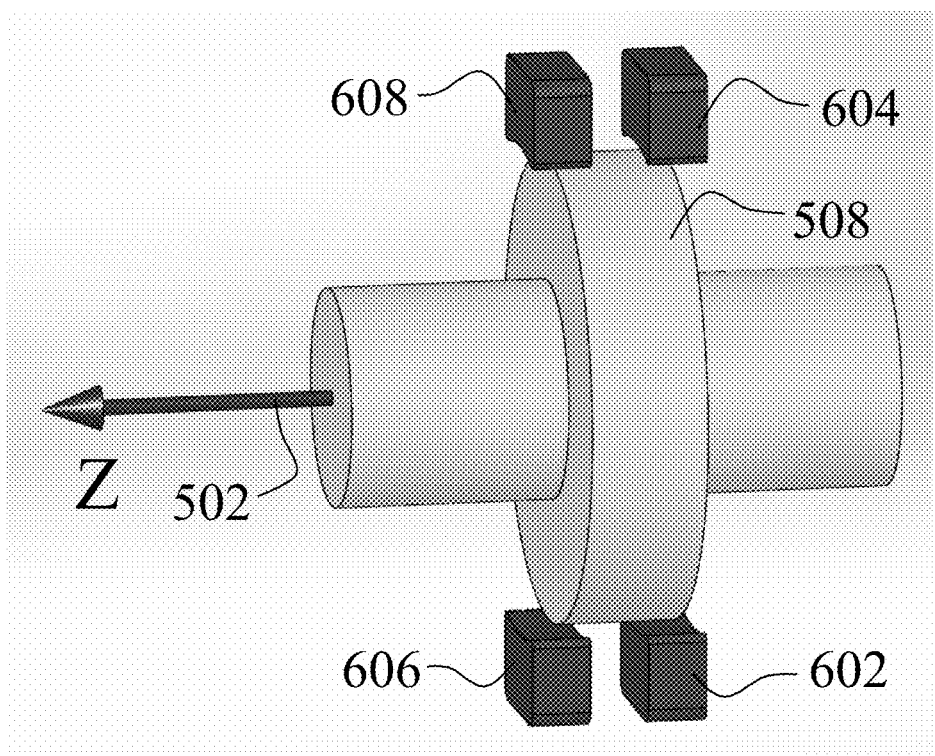
FIG. 17 is an alternative schematic diagram of the position sensor per present disclosure configured to measure axial displacements of a cylindrical sensor target, featuring better thermal stability than the system shown in FIG. 15.

FIG. 17 illustrates a sensor arrangement to measure the displacements of the sensor target 508 along the axis 502 which features improved tolerance to temperature variations and other factors that affect the individual sensor heads in the arrangement in identical ways. The arrangement shown in FIG. 17 differs from the arrangement shown in FIG. 15 in that it includes an additional pair of diametrically opposite sensor heads 606 and 608 identical to the sensor heads 602 and 604 but placed on the other axial edge of the rotational sensor target 508.

Figure 18:
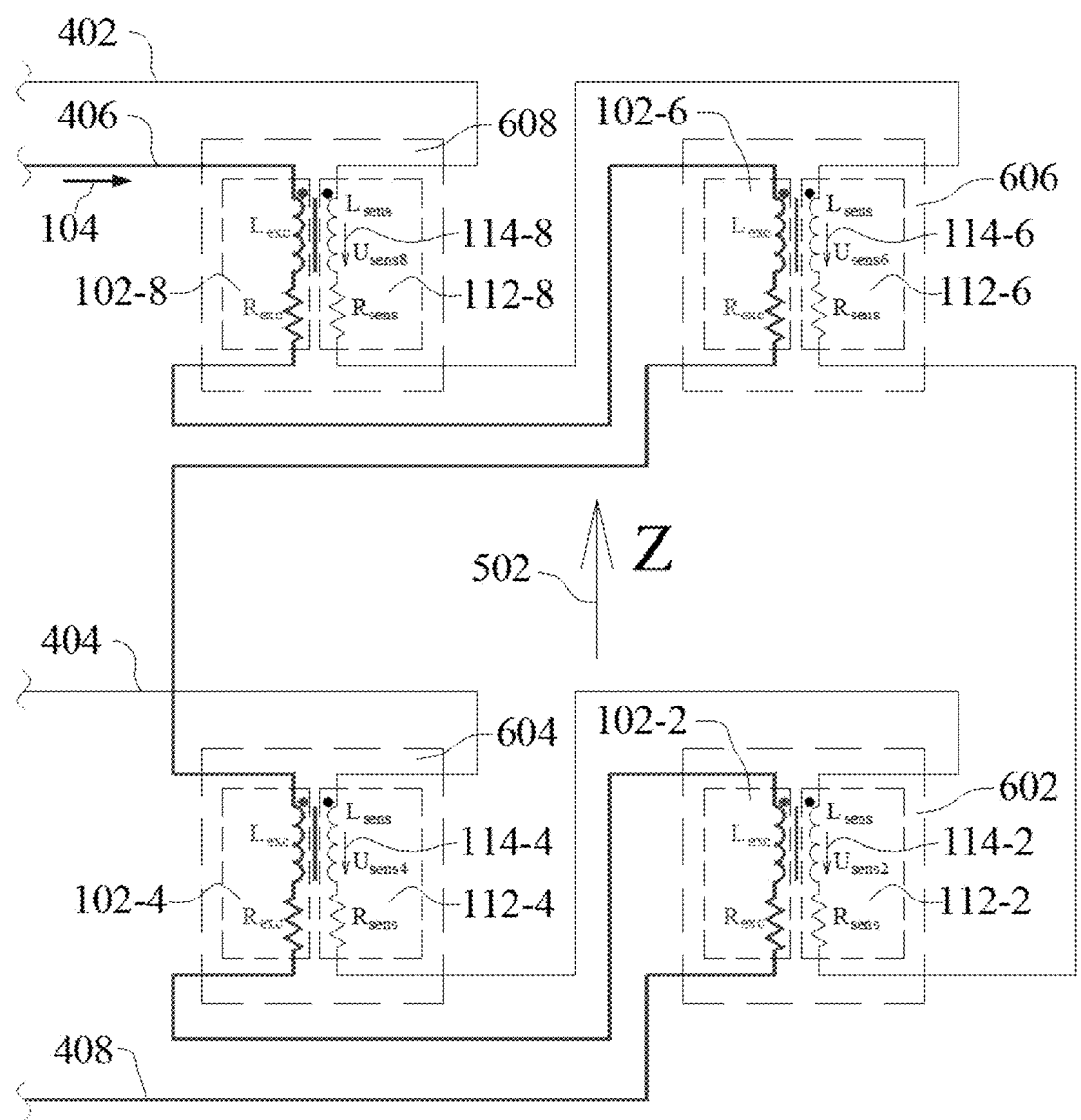
FIG. 18 is an example of an electrical wiring diagram for four sensor heads shown in FIG. 17.

FIG. 18 illustrates the interconnection diagram between the excitation PCB coils and between the sensing PCB coils within the four sensor heads. All the excitation PCB coils 102-2, 102-4, 102-6 and 102-8 have to be energized with the alternating excitation currents of the same amplitude. If all the excitation PCB coils 102-2, 102-4, 102-6 and 102-8 are connected in series, as illustrated in FIG. 18, the currents in all excitation PCB coil are not only equal in amplitude, but equal to each other at each instance of time.

The difference between the sum of the voltages $U_{sens6}$ (114-6) and $U_{sens8}$ (114-8) induced in the sensing PCB coils 112-6 and 112-8 and the sum of the voltages $U_{sens2}$ (114-2) and $U_{sens4}$ (112-4) induced in the sensing PCB coils 112-2 and 112-4 can be used as a measure of the sensor target 508 displacement in the Z-direction 502. The sum (difference) here implies that either amplitudes of two sinusoidal voltages are added (subtracted), or some other values proportional to the voltage amplitudes are added (subtracted) such as RMS values.

When the sensor target 508 moves, for example, in the positive Z-direction, the amount of the overlap between the outer cylindrical surface of the target 508 and the sensing PCB coils 112-2 and 112-4 located at the inner diameters of the sensor heads 602 and 604 decreases, but the amount of the overlap between the outer cylindrical surface of the target 508 and the sensing PCB coils 112-6 and 112-8 located at the inner diameters of the sensor heads 606 and 608 increases. Consequently, the voltages induced on the sensing coils 112-2, 112-4, as well as their sum increase, but the voltages induced on the sensing coils 112-6, 112-8, as well as their sum decrease. The difference between the sum of the voltages induced on the sensing coils 112-2, 112-4 and the sum of the voltages induced on the sensing coils 112-6, 112-8, used as a measure of the sensor target axial displacement in this case will become positive, representing a positive axial displacement of the sensor target 508.

It can be shown in exactly the same way that the negative displacements of the sensor target 508 along the Z axis will produce a negative difference between the sum of the voltages induced on the sensing coils 112-2, 112-4 and the sum of the voltages induced on the sensing coils 112-6, 112-8.

If the excitation currents in the excitation PCB coils 102-2, 102-4, 102-6 and 102-8 are equal to each other at each instance of time, which can be achieved by simply wiring these coils in series as shown in FIG. 18, the summation of the voltages $U_{sens2}$ (112-2) and $U_{sens4}$ (112-4) induced in the sensing PCB coils 112-2 and 112-4 can also be accomplished by wiring these coils in series as illustrated in FIG. 18. Given the directions of the currents in the excitation PCBs 102-2 and 102-4 after connecting those in series, the series connection of the sensing PCB coils 112-2 and 112-4 should be done so that the negative terminal of one of the coils is connected to the positive terminal of the other coil at any instance of the time when the voltages in the coils are not zeros. This ensures that the voltages 114-2 and 114-4 induced in the sensing PCB coils 112-2 and 112-4 are added instead of being subtracted at any instance of time.

Similarly, the summation of the voltages $U_{sens6}$ (112-6) and $U_{sens8}$ (112-8) induced in the sensing PCB coils 112-6 and 112-8 can also be accomplished by wiring these coils in series as illustrated in FIG. 18 with the attention paid to the phases of the two voltages to make sure that they add up instead of cancelling each other.

Furthermore, the subtraction of the sum of the voltages $U_{sens6}$ (112-6) and $U_{sens8}$ (112-8) from the sum of the voltages $U_{sens3}$ (112-2) and $U_{sens4}$ (112-4) can be accomplished by wiring two pairs of the sensing PCB coils 112-2, 112-4 and 112-6, 112-8 in series as illustrated in FIG. 18. In this case, given the directions of the currents in the excitation PCBs 102-2, 102-4, 102-6 and 102-8 after connecting those in series, and polarities of the voltages across the sensing coil pairs 112-2, 112-4 and 112-6, 112-8 after the coils within each pair were connected in series, the series connection between the sensing coil pairs 112-2, 112-4 and 112-6, 112-8 should be done so that two terminals of two coil pairs having the same polarity at any instance of the time when the voltages in the coils are not zeros are connected together (for example the negative terminal from one coil pair is connected to the negative terminal from the other coil pair, or the positive terminal from one coil pair is connected to the positive terminal from the other coil pair). This ensures that the voltages sums $U_{sens6}+U_{sens8}$ and $U_{sens2}+U_{sens4}$ are subtracted from each other at any instance of time instead of being added to each other.

The advantage of using two pairs of the sensor heads 602, 604 and 606, 608 located on the axially opposite edges of the rotational sensor target 508 as shown in FIG. 17 with the difference between the sums of the voltages induced on the sensing coils within each pair being used as a measure of the axial target displacement is that it allows eliminating effects of the factors that change the voltages induced in each pair of the sensing coils by the same amount, because those changes will cancel out when the voltages are subtracted.

For example, if the temperature changes cause the mechanical support of the sensor heads 602 and 604 to expand radially, both the sensor heads 602 and 604 may move further away from the sensor target 508. This will increase the amplitudes of the voltages $U_{sens2}$ and $U_{sens4}$ induced on the sensing PCB coils 112-2 and 112-4 by the same amount, and will, consequently increase the sum of the amplitude by twice that amount. Based on the sensor readings, an observer would conclude that the sensor target 508 has moved from the desirable location axially, even though in reality the sensor heads 602 and 604 have moved radially.

This error, however, could be prevented if an identical pair of sensor heads 606 and 608 was placed on the axially opposite edge of the sensor target 508 as shown in FIG. 17 and the difference between the sums of the voltages from the sensing PCB coils within the two pairs of the sensor heads 602, 604 and 606, 608 was used to measure the axial displacements of the sensor target 508. Assuming that the sensor head pair 606, 608 is identical to the sensor head pair 602, 604, mounted identically and exposed to the same temperature, when that temperature increases, for example, all four sensor heads 602, 604, 606 and 608 will move further away from the sensor target 508 by the same amount and the voltages on their sensing PCB coils 112-2, 112-4, 112-6 and 112-8 will increase by the same amount. As a results, when the sum of the voltages induced on the sensing PCB coils 112-6 and 112-8 is subtracted from the sum of the voltages induced on the sensing PCB coils 112-2 and 112-4, the voltage increases in individual sensing PCB coils will cancel out.

Figure 19:
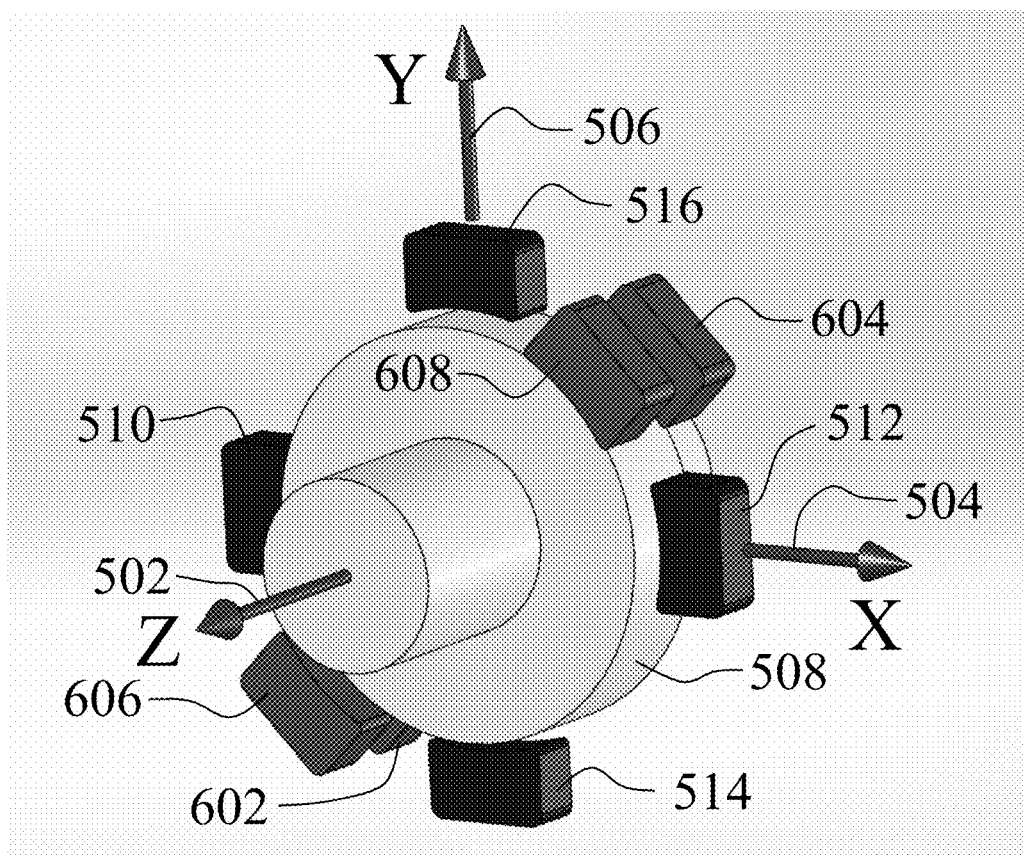
FIG. 19 is an example of an arrangement of the position sensors per present disclosure configured to measure radial and axial displacements of a cylindrical sensor target.

Both radial position sensor such as shown in FIG. 13 and an axial position sensor such as shown in FIGS. 15 and 17 can be placed around a single rotational sensor target 508 as illustrated in FIG. 19 to measure its radial and axial positions at the same time. A drawback of the sensor arrangement shown in FIG. 19 is that it requires the circumference of the sensor target to be long enough to accommodate at least six sensor heads (for example 510, 512, 514, 516, 602 and 604) around it with sufficient spacing to eliminate electromagnetic cross-talk between the sensor heads.

Figure 20:
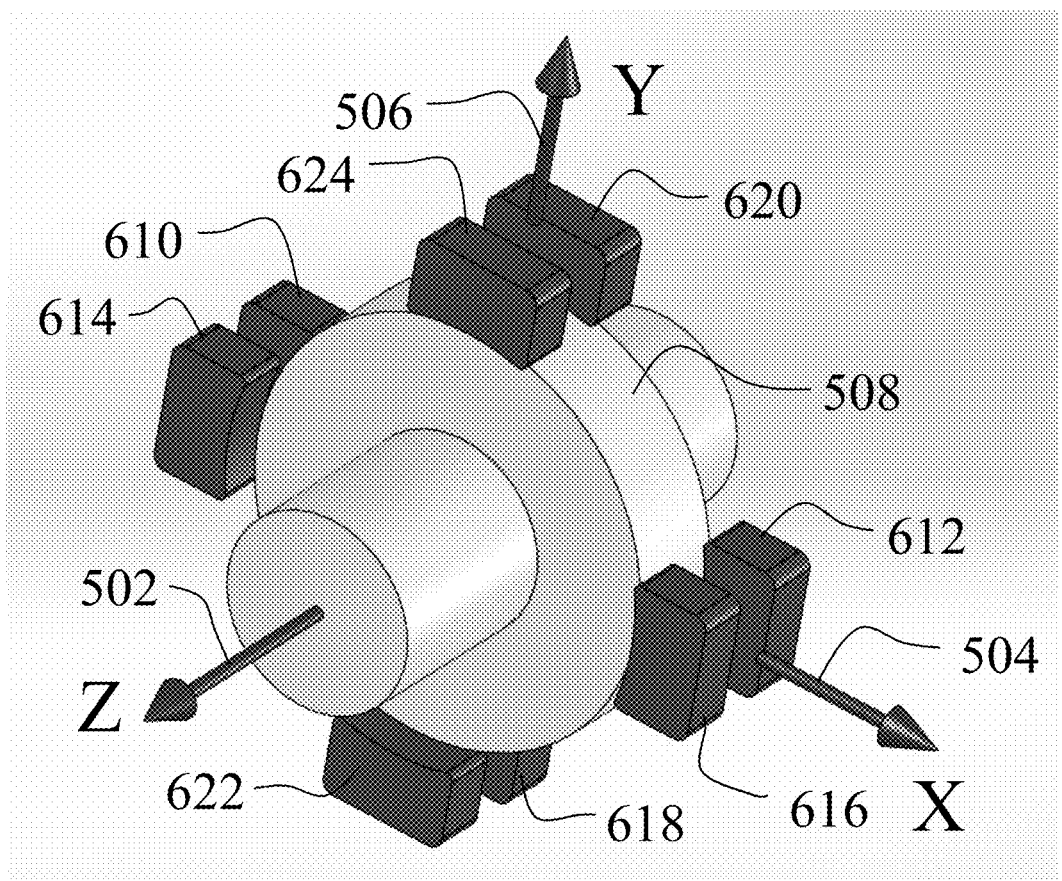
FIG. 20 is an alternative example of an arrangement of the position sensors per present disclosure configured to measure radial and axial displacements of a cylindrical sensor target, requiring smaller sensor target outer diameter than the arrangement shown in FIG. 19.

This drawback is overcome in the sensor arrangement shown in FIG. 20, which consists of two groups of four sensor heads: one group includes sensor heads 610, 612, 614 and 616 aligned along the X-axis 504 and the other group includes sensor heads 618, 620, 622 and 624 aligned along the Y-axis 506. The sensors in each group of four can further be divided into two pairs of diametrically opposite sensors: 610 and 612, 614 and 616, 618 and 620, 622 and 624. The two pairs of diametrically opposite sensor heads in each group of four are placed on the opposite axial edges of the sensor target symmetrically about the sensor target axial middle plane.

Each group of four sensor can be used to measure axial displacements along the Z-axis 502 and radial displacements along the axis aligned with this particular group of sensors. Thus sensors 610, 612, 614 and 616 allow measuring the sensor target displacements along the Z axis 502 and the X axis 504. Similarly, sensors 618, 620, 622 and 624 allow measuring the sensor target displacements along the Z axis 502 and the Y axis 506.

To illustrate the operation of this sensor arrangement, the group of sensor heads 610, 612, 614 and 616 aligned along the X-axis 504 is considered, which allow measuring the sensor target displacements along the Z axis 502 and the X axis 504.

Figure 21:
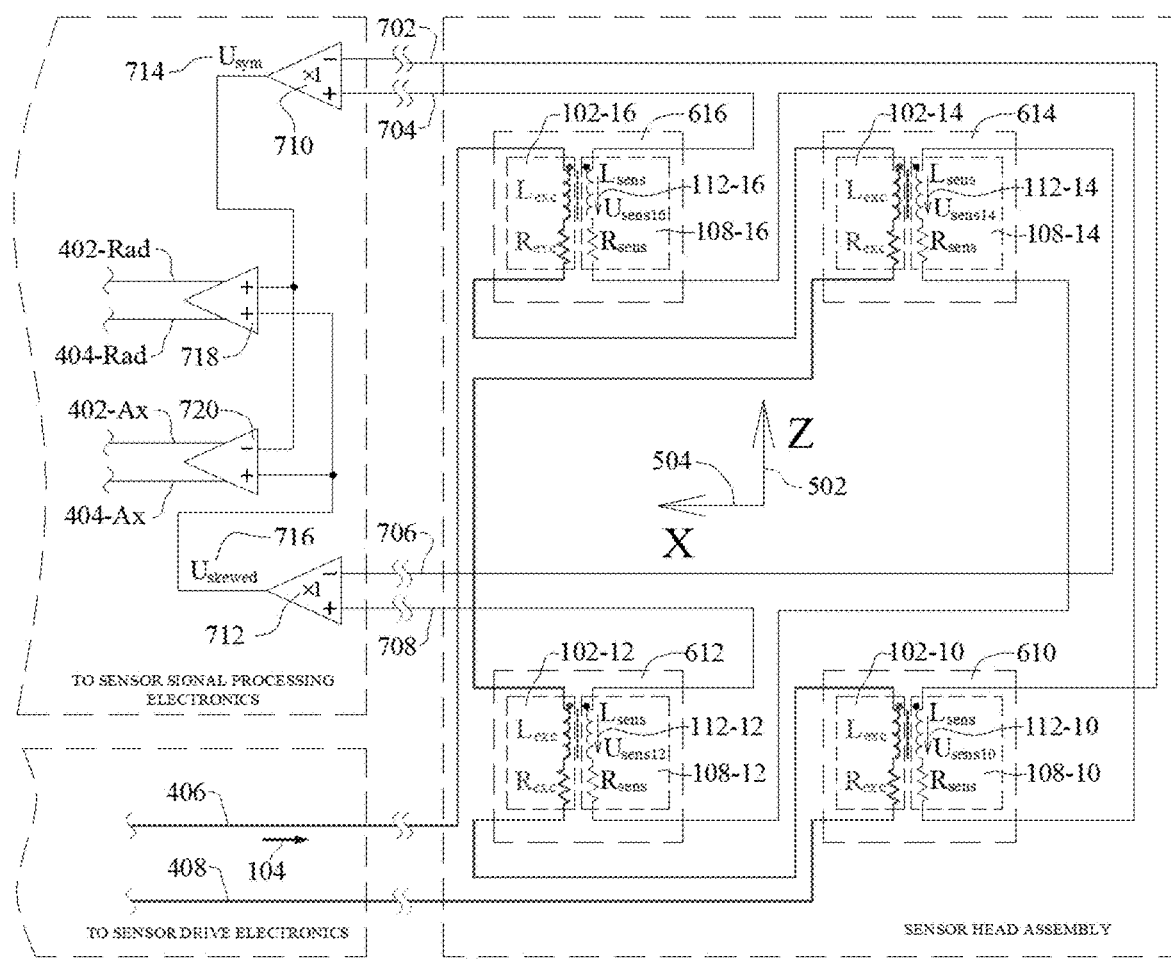
FIG. 21 is an example of an electrical wiring diagram for four sensor heads shown in FIG. 20 located in the X-Z coordinate plane.

FIG. 21 illustrates one of the possible methods of making connections between the excitation PCB coils and the connections between sensing PCB coils of four sensor heads 610, 612, 614 and 616. All four excitation PCB coils 102-10, 102-12, 102-14 and 102-16 belonging to the sensor heads 610, 612, 614 and 616 respectively are shown connected in series and energized with the excitation alternating current $I_{exc}$ 104. In principle, each excitation PCB coil may be energized with its own excitation current, or their can be divided into groups, each group energized with its own excitation current, as long as all of those currents have the same amplitude. In most cases, however, it is more practical to connect all four excitation PCB coils in series and energize them with a common current.

Similar to how it was done in the arrangement shown in FIGS. 17 and 18, the following combination of the voltages $U_{sens10}$, $U_{sens12}$, $U_{sens14}$ and $U_{sens16}$ induced in the sensing PCB coils 112-10, 112-12, 112-14 and 112-16 belonging to the sensor heads 610, 612, 614 and 616 respectively can be used as a measure of the sensor target 508 displacement along the Z-axis 502 independent of the sensor target 508 displacements along the X-axis:

$$U_{Z1}=(U_{sens10}+U_{sens12})-(U_{sens14}+U_{sens16}). \quad (21)$$

As before, summation or subtraction of sinusoidal alternating voltages $U_{sens10}$, $U_{sens12}$, $U_{sens14}$ and $U_{sens16}$ here means summation or subtraction of their amplitudes, or the values proportional to the amplitudes, such as RMS values.

If the excitation currents in the excitation PCB coils 102-10 and 102-12 are equal to each other at each instance of time, which can be achieved by simply wiring these coils in series as shown in FIG. 21, the summation of the voltages $U_{sens10}$ (112-10) and $U_{sens12}$ (112-12) induced in the sensing PCB coils 112-10 and 112-12 can also be accomplished by wiring these coils in series as illustrated in FIG. 21.

Given the directions of the currents in the excitation PCBs 102-10 and 102-12 after connecting those in series, the series connection of the sensing PCB coils 112-10 and 112-12 should be done so that the negative terminal of one of the coils is connected to the positive terminal of the other coil at any instance of the time when the voltages in the coils are not zeros. This ensures that the voltages 114-10 and 114-12 induced in the sensing PCB coils 112-10 and 112-12 are added instead of being subtracted at any instance of time.

Similarly, if the excitation currents in the excitation PCB coils 102-14 and 102-16 are equal to each other at each instance of time, which can be achieved by simply wiring these coils in series as shown in FIG. 21, the summation of the voltages $U_{sens14}$ (112-14) and $U_{sens16}$ (112-16) induced in the sensing PCB coils 112-14 and 112-16 can also be accomplished by wiring these coils in series as illustrated in FIG. 21.

Given the directions of the currents in the excitation PCBs 102-14 and 102-16 after connecting those in series, the series connection of the sensing PCB coils 112-14 and 112-16 should be done so that the negative terminal of one of the coils is connected to the positive terminal of the other coil at any instance of the time when the voltages in the coils are not zeros. This ensures that the voltages 114-14 and 114-16 induced in the sensing PCB coils 112-14 and 112-16 are added instead of being subtracted at any instance of time.

Finally, if the excitation currents in all four excitation PCB coils 102-10, 102-12, 102-14 and 102-16 are equal to each other at each instance of time, which can be achieved by simply wiring these coils in series as shown in FIG. 21, the subtraction of the sum of the voltages $U_{sens14}$ (112-14) and $U_{sens16}$ (112-16) from the sum of the voltages $U_{sens10}$ (112-10) and $U_{sens12}$ (112-12) can be accomplished by wiring two pair of the sensing PCB coils 112-14, 112-16 and 112-10, 112-12 in series as illustrated in FIG. 21. In this case, given the directions of the currents in the excitation PCBs 102-10, 102-12, 102-14 and 102-16 after connecting those in series, and polarities of the voltages across the sensing coil pairs 112-10, 112-12 and 112-14, 112-16 after the coils within each pair were connected in series, the series connection between the sensing coil pairs 112-10, 112-12 and 112-14, 112-16 should be done so that two terminals of two coil pairs having the same polarity at any instance of the time when the voltages across the coil pairs are not zeros are connected together (for example the negative terminal from one coil pair is connected to the negative terminal from the other coil pair, or the positive terminal from one coil pair is connected to the positive terminal from the other coil pair). This ensures that the voltages sums $U_{sens10}+U_{sens12}$ and $U_{sens14}+U_{sens16}$ are subtracted from each other at any instance of time instead of being added to each other.

Either difference of the voltages $U_{x1}=U_{sens10}-U_{sens12}$ or $U_{x2}=U_{sens14}-U_{sens16}$ can be used to measure the sensor target 508 displacements along the X-axis 502 similar to how it was done with voltages $U_{sens10}$ and $U_{sens12}$ induced in the sensing PCB coils 112-10 and 112-12 belonging to the sensor heads 510 and 512 respectively in FIGS. 13 and 14. However, contrary to the FIG. 13, where the outer cylindrical surface of the sensor target 508 was extended axially beyond the boundaries of the sensor heads 510 and 512 to prevent effects of the sensor target 508 movements along the Z-axis 502 or effects of the sensor target 508 tilts around the Y-axis 504, sensor heads 610, 612, 614 and 616 in FIG. 20 are only partially covered by the outer cylindrical surface of the sensor target 508.

Movements of the sensor target 508 along the Z-axis 502 still do not affect either voltage difference $U_{x1}$ or $U_{x2}$ because they cause voltage $U_{sens10}$ and $U_{sens12}$ to change by the same amount, and cause voltages $U_{sens14}$ and $U_{sens16}$ to change by the same amount. The voltage differences $U_{x1}$ and $U_{x2}$, therefore, do not change.

Tilts of the sensor target 508 around the Y-axis 504, on the other hand, do affect the voltage differences $U_{x1}$ and $U_{x2}$ because they cause voltage $U_{sens10}$ and $U_{sens12}$ to change by the same amount but in the different directions, and cause voltages $U_{sens14}$ and $U_{sens16}$ to change by the same amount in different directions. The voltage difference $U_{x1}$ and $U_{x2}$, therefore, will change by twice that amount. To eliminate the tilt effects on the radial position readings the following voltage combination is constructed:

$$U_X=U_{x1}+U_{x2}=(U_{sens10}-U_{sens12})+(U_{sens14}-U_{sens16}) \quad (22)$$

Since a tilt of the sensor target 508 around the Y-axis 504 changes voltages $U_{sens10}$ and $U_{sens16}$ by the same amount, and changes voltages $U_{sens12}$ and $U_{sens14}$ by the same amount, the voltage combination $U_X$ given by the equation (22) will not change. The voltage combination $U_X$ is also insensitive to the displacements of the sensor target 508 along the Z-axis 502 because, as shown earlier, $U_{x1}$ and $U_{x2}$ are not affected by it. Therefore, the voltage combination $U_X$ given by the equation (22) can be used as a measure of the sensor target 508 displacement along the X-axis 504 independent of the rotor displacements along the Z-axis (502) and tilts around the Y-axis (506).

We can regroup the equations (21) and (22) to produce equation (23) and (24) respectively:

$$U_{Z1}=(U_{sens10}-U_{sens16})+(U_{sens12}-U_{sens14}) \quad (23)$$

$$U_X=(U_{sens10}-U_{sens16})-(U_{sens12}-U_{sens14}) \quad (24)$$

If a symmetric voltage combination term $U_{sym}$ is defined as $$U_{symXZ}=(U_{sens10}-U_{sens16}) \quad (25)$$

and a skewed voltage combination term $U_{skewed}$ as $$U_{skewedXZ}=(U_{sens12}-U_{sens14}) \quad (26)$$

the equations (23) and (24) can be re-written as $$U_{Z1}=U_{symXZ}+U_{skewedXZ} \quad (27)$$

$$U_X=U_{symXZ}-U_{skewedXZ} \quad (28)$$

It can be noticed that the voltage $U_{sen10}$ is produced by the sensing PCB coil 112-10, which belongs to the sensor head 610 located in the coordinate quadrant with negative X and negative Z (X– Z–), the voltage $U_{sen16}$ is produced by the sensing PCB coil 112-16, which belongs to the sensor head 616 located in the coordinate quadrant with positive X and positive Z (X+ Z+), the voltage $U_{sen12}$ is produced by the sensing PCB coil 112-12, which belongs to the sensor head 610 located in the coordinate quadrant with positive X and negative Z (X+ Z–) and the voltage $U_{sen14}$ is produced by the sensing PCB coil 112-14, which belongs to the sensor head 614 located in the coordinate quadrant with negative X and positive Z (X+ Z–).

Therefore, based on the equations 25 through 28 it can be said that Z-displacement signal is a sum of the symmetric and the skewed sensor head signal combinations and X-displacement signal is a difference between the symmetric and the skewed sensor head signal combinations.

The symmetric sensor head signal combination is equal to the difference between signals from the sensor head located in the coordinate quadrant where both X and Z coordinates are negative and signals from the sensor head located in the coordinate quadrant where both X and Z coordinates are positive.

The skewed sensor head signal combination is equal to the difference between signals from the sensor head located in the coordinate quadrant where X coordinates are positive but Z coordinates are negative and signals from the sensor head located in the coordinate quadrant where X coordinates are negative but Z coordinates are positive.

Similar to the equations 25-28 above written for measuring displacements along the Z and X axes using sensor heads 610, 612, 614 and 616, equations 29-32 below can be derived for measuring displacements along the Z and Y axes using sensor heads 618, 620, 622 and 624

$$U_{symYZ}=(U_{sens18}-U_{sens24}) \quad (29)$$

$$U_{skewedYZ}=(U_{sens20}-U_{sens22}) \quad (30)$$

$$U_{Z2}=U_{symYZ}+U_{skewedYZ} \quad (31)$$

$$U_X=U_{symYZ}-U_{skewedYZ}. \quad (32)$$

In general, the following can be said for an arbitrary radial axis X or Y.

Axial displacement signal is a sum of the symmetric and the skewed sensor head signal combinations and radial displacement signal is a difference between the symmetric and the skewed sensor head signal combinations.

The symmetric sensor head signal combination is equal to the difference between signals from the sensor head located in the coordinate quadrant where both radial and axial coordinates are negative and signals from the sensor head located in the coordinate quadrant where both radial and axial coordinates are positive.

The skewed sensor head signal combination is equal to the difference between signals from the sensor head located in the coordinate quadrant where radial coordinates are positive but axial coordinates are negative and signals from the sensor head located in the coordinate quadrant where radial coordinates are negative but the axial coordinates are positive.

In the interconnection diagram shown in FIG. 21 all four excitation PCB coils 102-10, 102-12, 102-14 and 102-16 are connected in series and energized with the same excitation currents $I_{exc}$. In this case all the voltages $U_{sens10}$, $U_{sens12}$, $U_{sens14}$ and $U_{sens16}$ will be in phase, and adding or subtracting the voltage amplitudes can be achieved by wiring the corresponding sensing PCB coils 112-10, 112-12, 112-14 and 112-16 respectively in series with two opposite coil poles being connected together for the voltage addition and two identical coil poles being connected together for the voltage subtraction.

Thus FIG. 21 shows the sensing PCB coils 112-10 and 112-16 being connected in series so that the symmetric voltage combination is formed $U_{symXZ}=U_{sens10}-U_{sens16}$ and the sensing PCB coils 112-12 and 112-14 being connected in series so that the skewed voltage combination is formed $U_{skewedXZ}=U_{sens12}-U_{sens14}$. The symmetric and the skewed voltage combinations $U_{symXZ}$ and $U_{skewedXZ}$ are received by differential buffer amplifiers 710 and 712 respectively, which outputs are added in accordance with the equation 26 to produce the raw axial position sensor output at the signal summation element 718 as well as subtracted in accordance with the equation 27 to produce the raw radial position sensor output at the signal subtraction element 720.

Both sensor arrangements shown in FIGS. 19 and 20-21 have the same number of sensor heads (eight) and the same number of connection wires between the sensor drive electronics and the sensor head arrangements as well as between the sensor signal processing electronics and sensor arrangements. The arrangement shown in FIG. 20, however, has two significant advantages:

1. It requires smaller length of the sensor target circumference
2. Each X-Z and Y-Z groups of the sensor heads in FIG. 20 measures the axial displacement of the sensor target with the same gain as the axial sensor in FIG. 19. The axial position readings from the two groups can either be added together to produce twice the axial gain compared to FIG. 19, or one of these readings can be left redundant for improved reliability.

Figure 22:
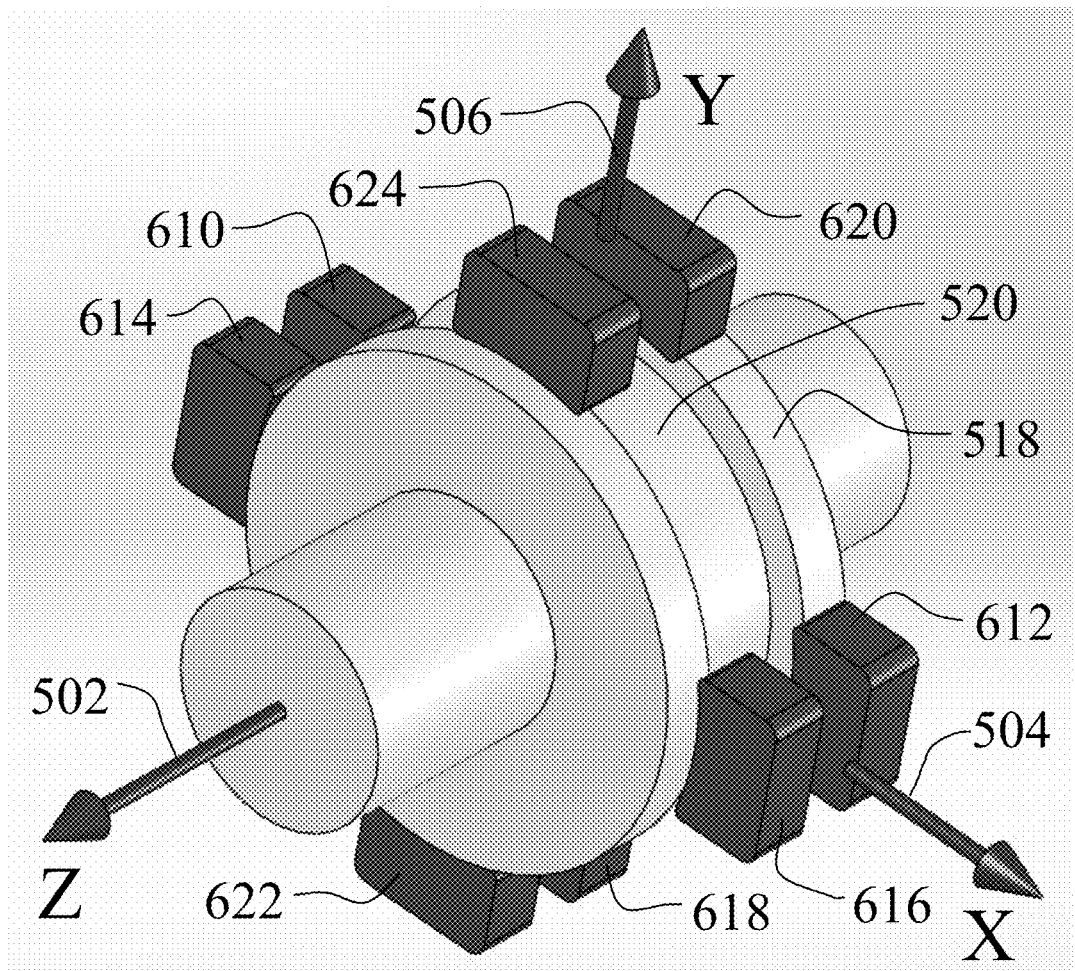
FIG. 22 is an alternative implementation of the sensor arrangement shown in FIG. 20 with two cylindrical sensor target surfaces covering the portions of the sensor heads located outboard from the middle plane of the sensor assembly.

For some applications, a modification of the system shown in FIG. 20 in which a central cylindrical cut is made in the outer cylindrical surface of the sensor target 518 as illustrated in FIG. 22 could be a better fit. In more details, FIG. 22 shows the sensor target 518 extended axially so that its outer cylindrical surface extends beyond the envelopes of the sensor heads 610, 612, 614, 616, 618, 620, 622 and 624 but at the same time a cylindrical cut 520 made at the center of the outer cylindrical surface of the sensor target 518 so that the remaining portions of that surface only partially overlap with the sensing PCBs located inside the sensor heads.

Operation of the system shown in FIG. 22 is identical to that of the system shown in FIG. 20, except for the sign of the axial signal which reverses because those sensor heads that used to get more covered by the outer cylindrical surface of the sensor target 518 in FIG. 20 when the sensor target 508 moved axially, get covered less in FIG. 22 and vice versa. For example, positive displacements of the sensor target 508 in FIG. 20 used to lead to higher coverage of the sensor heads 614, 616, 622 and 624 by the outer cylindrical surface of the sensor target 518, and lower coverage of the sensor heads 610, 612, 618 and 620. On the contrary, in FIG. 22 positive displacements of the sensor target 508 lead to lower coverage of the sensor heads 614, 616, 622 and 624 and higher coverage of the sensor heads 610, 612, 618 and 620.

Figure 23:
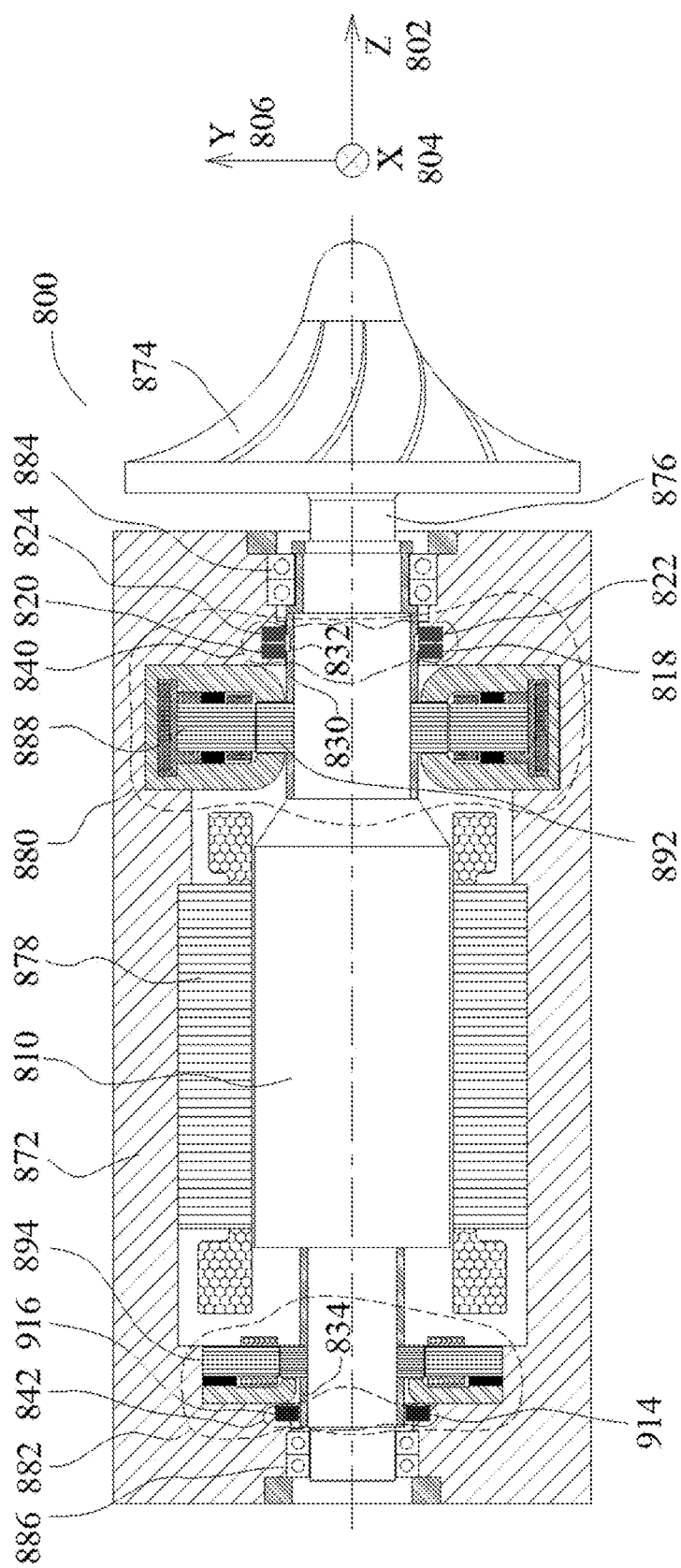
FIG. 23 is a side cross-sectional view of an electrical machine equipped with an Active Magnetic Bearing (AMB) system incorporating an embodiment of the position sensor per the present disclosure.

In some aspects, the disclosed position sensor may be utilized as a part of an Active Magnetic Bearing (AMB) system to support an object without a mechanical contact. FIG. 23 shows an example of using an AMB system in an electric rotational machine 800. The rotational electric machine 800 can be, for example, an electric compressor including an electric motor 872 driving an impeller 874 mounted directly on the motor shaft 876. The electric motor 872 shown in FIG. 23 has a rotor 810 and a stator 878. Alternatively, the impeller 874 can be driven by a flow of gas or liquid and spin the rotor 810 attached to it through the shaft 876. In this case the motor 872 can be used as a generator that would convert the mechanical energy of the rotor 810 into electricity. In embodiments, the rotor 810 of the electric machine 800 can be supported radially and axially without mechanical contact by front and rear radial AMBs 880 and 882. The front AMB 880 provides an axial suspension of the entire rotor 810 and a radial suspension of the front end of the rotor, whereas the rear AMB 882 provides only radial suspension of the rear end of the rotor 810. When the AMBs 880 and 882 are not operating, the rotor can rest on the mechanical backup bearings 884 and 886. The front backup bearing 884 provides the axial support of the entire rotor 810 and a radial support of the rotor front end, whereas the rear backup bearing 886 provides only radial support of the rear end of the rotor 810. There are sufficient radial clearances between the inner diameters of the mechanical backup bearings 884, 886 and the outer diameters of the rotor portions interfacing with those bearing to allow the rotor 810 to be positioned radially without touching the backup bearings 884, 886 when the AMBs 880 and 882 are activated. Similarly, there may be sufficient axial clearances between the backup bearings 884, 886 and the portions of the rotor 810 interfacing with those bearings to allow the rotor 810 to be positioned axially without touching the backup bearings 884 and 886 when the AMBs 880 and 882 are activated.

The front AMB 880 consists of an electromagnetic actuator 888, a combination radial/axial position sensor 840 per FIG. 22 and control electronics (not shown). The combination radial/axial position sensor 840 includes sensor heads 810, 812, 814, 816, 818, 820, 822 and 824 identical to the sensor heads 610, 612, 614, 616, 618, 620, 622 and 624 in FIG. 22 placed around the sensor target 830 firmly mounted on or made integral to the rotor 810. The sensor heads 810, 812, 814 and 816 are placed along the X-axis 804 (they cannot be seen in the cross-section shown in FIG. 23) whereas the sensor heads 818, 820, 822 and 824 are placed along the Y-axis 806. The sensor target 830 has a slot 832 similar to the slot 520 in FIG. 22.

The electromagnetic actuator 888 is capable of exerting radial and axial forces on the actuator target 892 firmly mounted on the rotor 810. The axial force is the force in the direction of Z-axis 802 and the radial forces are forces in the direction of X-axis 804 (directed into the page) and the direction of Y-axis 806. The actuator has three sets of coils corresponding to each of the axes and the forces are produced when the corresponding coils are energized with control currents produced by control electronics (not shown). The position of the front end of the rotor in space is constantly monitored by the non-contact position sensor 840.

Signals from the position sensor 840 are input into the control electronics (not shown), which generate currents in the control coils of the electromagnetic actuator 888 whenever it finds that the rotor is deflected from the desired position such that these currents produce forces pushing the rotor back to the desired position.

The rear AMB 882 consists of an electromagnetic actuator 894, radial non-contact position sensor 842 per FIG. 13, and control electronics (not shown). The radial position sensor 842 includes sensor heads 910, 912, 914 and 916 identical to the sensor heads 510, 512, 514 and 516 in FIG. 13 placed around the sensor target 834 firmly mounted on or made integral to the rotor 810. The sensor heads 910 and 912 are placed along the X-axis 804 (they cannot be seen in the cross-section shown in FIG. 23) whereas the sensor heads 914 and 916 are placed along the Y-axis 806.

The rear AMB 882 functions identically to the front AMB 888 except that it does not control the axial position of the rotor 810 because this function is already performed by the front AMB 880. Correspondingly, the electromagnetic actuator 894 may not be able to exert a controllable axial force on the rotor 810 and the position sensor 842 may not be able to measure the axial position of the rotor 810.

A number of implementations have been described. Nevertheless, it will be understood that various modifications may be made. Accordingly, other implementations are within the scope of the following claims.

What is claimed is:

1. An apparatus to determine the position of a sensor target relative to a sensor head along a measurement axis, the apparatus comprising:
   a sensor head comprising:
   an excitation coil, and
   a sensing coil, the excitation coil and the sensing coils are formed by printed circuit board traces, the excitation coil and the sensing coil are located one on top of the other, the excitation coil and the sensing coil separated by a first distance so that when the excitation coil is energized with an alternating excitation electrical current, a resulting alternating excitation magnetic field couples to the sensing coil and induces alternating sensing voltage across sensing coil terminals;
   a sensor target movable in relation to the sensor head, the sensor target is made of an electrically conductive material and separated by a second distance from the electrical sensing coil on the side of the electrical sensing coil opposite to the excitation coil so that the position of the sensor target along a measurement axis affects an amount of an alternating excitation magnetic field which couples to the sensing coil and an alternating sensing voltage across the sensing coil terminals, the alternating sensing voltage is a representation of sensor target displacements;
   a sensor drive electronics generating a sinusoidal, or substantially sinusoidal, electrical current in the excitation coil, wherein the sensor drive electronics comprises:
   a capacitor connected in series with the excitation coil to form a series LCR circuit, and
   a positive feedback closed around the series LCR circuit to induce alternating excitation electrical current at the resonance frequency of the series LCR circuit, the positive feedback comprises
   an electrical current sensor which measures the alternating excitation electrical current in the series LCR circuit,
   an adjustable gain amplifier configured to apply an alternating voltage to the terminals of the excitation coil proportional to the measured alternating excitation electrical current, and current-limiting negative feedback control configured to reduce the gain of the adjustable gain amplifier when the absolute value of the alternating excitation electrical current increases in order to limit the amplitude of the alternating excitation electrical current; and sensor signal processing electronics configured to:

receive the alternating sensing voltage from the sensing coil, and transform the alternating sensing voltage into a desirable form of output representing the sensor target displacements along the measurement axis.

2. The apparatus of claim 1 further comprising a current-amplitude feedback control which adjusts the gain of the adjustable gain amplifier in order to maintain a constant average value of the amplitude of the alternating excitation electrical current over time.

3. The apparatus of claim 1, further comprising a current-time-derivative-amplitude control loop configured to adjust the gain of the adjustable gain amplifier in order to maintain a constant average value of the amplitude of the time derivative of the alternating excitation electrical current over time.

4. The apparatus of claim 1 wherein the excitation coil and the sensing coils are formed by traces on a flexible printed circuit board and the flexible printed circuit board is shaped so that there is a uniform distance separating the sensing coil from the sensor target surface adjacent to the sensing coil.

5. The apparatus of claim 1, wherein displacements of the sensor target relative to the along the measurement axis change the second distance separating the sensor target from the sensing coil.

6. The apparatus of claim 1, wherein an overlap is present between the sensing coil and the sensor target surface adjacent to the sensing coil and displacements of the sensor target relative to the sensor head along the measurement axis change the amount of the overlap between the sensing coil and the sensor target surface adjacent to the sensing coil.

7. The apparatus of claim 1, wherein a soft-magnetic backiron is added on the side of the excitation coil opposite to the sensing coil.

8. The apparatus of claim 7, wherein the soft-magnetic backiron is formed by a mix of fine powder of a soft-magnetic metal and a bonding agent.

9. The apparatus of claim 1, wherein the excitation coil and the sensing coil are formed by two sub-coils located side by side and connected in series so that the winding direction of a first sub-coil of the two sub-coils is opposite to the winding direction of a second sub-coil of the two sub-coils.

10. The apparatus of claim 1, wherein the sensor target is cylindrical in shape and has a rotational axis and a cylindrical sensing surface, the measurement axis is the first measurement axis, the apparatus further comprising a second measurement axis, the first measurement axis is perpendicular to the rotational axis and the second measurement axis is perpendicular to both the rotational axis and the first measurement axis, wherein the sensor head is the first sensor head, the apparatus further comprising:
a second sensor head,
a third sensor head, and
a fourth sensor head, each of the second sensor head, the third sensor head and the fourth sensor head identical to the first sensor head, and located in a plane perpendicular to the rotational axis with the sensing coils adjacent to the cylindrical sensing surface of the sensor target, wherein the cylindrical sensing surface of the sensor target extends axially beyond axial boundaries of the sensing coils in both directions, wherein the first sensor head and the second sensor head are located diametrically opposite from each other along the first measurement axis, wherein the third sensor head and the fourth sensor head are located diametrically opposite from each other along the second measurement axis, wherein the excitation coils of the first sensor head and the second sensor head are energized with alternating excitation electrical currents of the same amplitude, wherein the excitation coils of the third sensor head and the fourth sensor head are energized with alternating excitation electrical currents of the same amplitude, wherein the difference between amplitudes of the voltages induced across the sensing coils in the first sensor head and the second sensor head used as representations of the sensor target displacements along the first measurement axis, wherein the difference between amplitudes of the voltages induced across the sensing coils in the third sensor head and the fourth sensor head used as representations of the sensor target displacements along the second measurement axis.

11. The apparatus of claim 1, wherein the sensor target is cylindrical in shape and has a rotational axis and a cylindrical sensing surface, the measurement axis is the rotational axis, the sensor head is the first sensor head, the apparatus further comprising a second sensor head identical to the first sensor head and located in the same plane perpendicular to the rotational axis diametrically opposite from the first sensor head, wherein the sensing coils of the first sensor head and the second sensor head adjacent to the cylindrical sensing surface of the sensor target, wherein the cylindrical sensing surface of the sensor target partially covers the sensing coils axially, wherein the excitation coils of the first sensor head and the second sensor head are energized with alternating excitation electrical currents of the same amplitude, wherein the difference between amplitudes of the voltages induced across the sensing coils in the first sensor head and the second sensor head used as a representation of the sensor target displacements along the sensor target rotational axis.

12. The apparatus of claim 1, wherein the sensor target is cylindrical in shape and has a rotational axis, a cylindrical sensing surface, two axially opposite axial faces and an axial middle plane, the rotational axis is the measurement axis, wherein the sensor head is the first sensor head, the apparatus further comprising:
a second sensor head,
a third sensor head, and
a fourth sensor head, each of the second sensor head, the third sensor head and the fourth sensor head identical to the first sensor head and located in a single sensor location axial plane passing through the rotational axis with the sensing coils adjacent to the cylindrical sensing surface of the sensor target, wherein the first and the second sensor heads are located in the same first radial sensor location plane perpendicular to the rotational axis and adjacent to the first axial face of the cylindrical sensor target so that their sensing coils are partially covered by the cylindrical sensing surface, wherein the third and the fourth sensor heads are located in the same second radial sensor location plane perpendicular to the rotational axis and adjacent to the second axial face of the cylindrical sensor target so that their sensing coils are partially covered by the cylindrical sensing surface, wherein the first and the third sensor heads are symmetrical about the sensor target middle plane, wherein the second and the fourth sensor heads are symmetrical about the sensor target middle plane, wherein the excitation coils of the first, the second, the third and the fourth sensor heads are energized with alternating excitation electrical currents of the same amplitude, wherein the difference between the sum of the amplitudes of the voltages induced across the sensing coils in the first and the second sensor heads and the sum of the amplitudes of the voltages induced across the sensing coils in the third and the fourth sensor heads used as a raw measure of the sensor target displacements along the sensor target rotational axis.

13. The apparatus of claim 12, wherein the rotational axis is the first measurement axis, the second measurement axis is directed radially from the first sensor head and the third sensor head to the second sensor head and the fourth sensor head, a symmetric voltage combination is defined as a difference of the amplitudes of the voltages induced across the sensing coils in the first and the fourth sensor heads, a skewed voltage combination is defined as a difference of the amplitudes of the voltages induced across the sensing coils in the second and the third sensor heads, the sum of the amplitudes of the symmetric and skewed voltage combinations is used as a raw measure of the sensor target displacements along the first measurement axis, the difference between the amplitudes of the symmetric and skewed voltage combinations is used as a raw measure of the sensor target displacements along the second measurement axis.

14. The apparatus of claim 13, wherein the sensor location axial plane is the first sensor location axial plane, the apparatus further comprising a second sensor location axial plane passing through the rotational axis perpendicular to the first sensor location axial plane, the apparatus further comprising
a fifth sensor head,
a sixth sensor head,
a seventh sensor head, and
an eighth sensor heads identical to the first sensor head, the second sensor head, the third sensor head and the fourth sensor head, wherein the fifth, the sixth, the seventh and the eights sensor heads are located in the second sensor location axial plane with the sensing coils adjacent to the cylindrical sensing surface of the sensor target, wherein the fifth and the sixth sensor heads are located in the first radial sensor location plane, adjacent to the first axial face of the cylindrical sensor target so that their sensing coils are partially covered by the cylindrical sensing surface, wherein the seventh and the eight sensor heads are located in the second radial sensor location plane perpendicular to the rotational axis, adjacent to the second axial face of the cylindrical sensor target so that their sensing coils are partially covered by the cylindrical sensing surface, wherein the fifth and the seventh sensor heads are symmetrical about the sensor target middle plane, wherein the sixth and the eighth sensor heads are symmetrical about the sensor target middle plane, wherein the excitation coils of the fifth sensor head, the sixth sensor head, the seventh sensor head and the eighth sensor head are energized with alternating excitation electrical currents of the same amplitude, wherein a symmetric voltage combination is the first symmetric voltage combination, a second symmetric voltage combination is defined as a difference of the amplitudes of the voltages induced across the sensing coils in the fifth and the eights sensor heads, wherein the skewed voltage combination is the first skewed voltage combination, a second skewed voltage combination is defined as a difference of the amplitudes of the voltages induced across the sensing coils in the sixth and the seventh sensor heads, wherein the sum of the amplitudes of the second symmetric and the second skewed voltage combinations is used as the second raw measure of the sensor target displacements along the first measurement axis, wherein a third measurement axis is directed radially from the fifth and seventh sensor heads to the sixth and eighth sensor head, wherein a difference between the amplitudes of the second symmetric and the second skewed voltage combinations is used as a raw measure of the sensor target displacements along the third measurement axis.

* * * * *